US011950202B2

(12) United States Patent
Omer et al.

(10) Patent No.: US 11,950,202 B2
(45) Date of Patent: Apr. 2, 2024

(54) SYSTEMS AND METHODS FOR ACCOMMODATING FLEXIBILITY IN SENSING TRANSMISSIONS

(71) Applicant: Cognitive Systems Corp., Waterloo (CA)

(72) Inventors: Mohammad Omer, Waterloo (CA); Chris Beg, Waterloo (CA)

(73) Assignee: COGNITIVE SYSTEMS CORP., Waterloo (CA)

(*) Notice: Subject to any disclaimer, the term of this patent is extended or adjusted under 35 U.S.C. 154(b) by 0 days.

(21) Appl. No.: 17/824,611

(22) Filed: May 25, 2022

(65) Prior Publication Data

US 2022/0386272 A1    Dec. 1, 2022

Related U.S. Application Data

(60) Provisional application No. 63/193,287, filed on May 26, 2021.

(51) Int. Cl.
*H04W 64/00* (2009.01)
*H04W 84/12* (2009.01)

(52) U.S. Cl.
CPC .......... *H04W 64/006* (2013.01); *H04W 84/12* (2013.01)

(58) Field of Classification Search
CPC ......... H04W 4/38; H04W 4/70; H04W 84/18; H04W 4/33; H04W 4/023; H04W 56/001; H04W 88/02; H04W 8/24; H04W 8/005; H04W 24/10; H04W 48/04; H04W 24/00; H04W 4/48; H04W 92/18; H04W 12/0471
See application file for complete search history.

(56) References Cited

U.S. PATENT DOCUMENTS

| | | | |
|---|---|---|---|
| 2009/0248913 A1 | 10/2009 | Salokannel | |
| 2014/0185599 A1* | 7/2014 | Vatanapanpilas | H04W 48/20 370/338 |
| 2017/0230218 A1* | 8/2017 | Park | H04L 5/0044 |
| 2018/0365909 A1* | 12/2018 | Cheng | H04L 67/12 |
| 2019/0007973 A1 | 1/2019 | Lou et al. | |
| 2020/0359248 A1 | 11/2020 | Sadeghi et al. | |
| 2021/0273735 A1 | 9/2021 | Da Silva et al. | |
| 2021/0288779 A1 | 9/2021 | Da Silva et al. | |
| 2022/0070710 A1* | 3/2022 | Lim | H04W 24/10 |
| 2022/0070927 A1 | 3/2022 | Lim et al. | |
| 2022/0304051 A1 | 9/2022 | Aboul-Magd et al. | |

FOREIGN PATENT DOCUMENTS

| WO | 2014/205011 A2 | 12/2014 |
|---|---|---|
| WO | 2022148461 A1 | 7/2022 |

* cited by examiner

*Primary Examiner* — Kwasi Karikari
(74) *Attorney, Agent, or Firm* — MEDLER FERRO WOODHOUSE & MILLS PLLC

(57) ABSTRACT

Systems and methods for accommodating flexibility in sensing transmissions are provided. Wi-Fi sensing systems include sensing devices and remote devices configured to communicate through radio-frequency signals. Initially, a sensing device transmits a sensing configuration message to a remote device. The sensing device receives a sensing configuration response message in response to the sensing configuration message. In an example, the sensing configuration response message may include a transmission capability indication associated with the remote device. The transmission capability indication includes a flexibility indication that the remote device supports flexibility.

24 Claims, 15 Drawing Sheets

SYSTEMS AND METHODS FOR ACCOMMODATING FLEXIBILITY IN SENSING TRANSMISSIONS

CROSS-REFERENCE TO RELATED APPLICATION(S)

The present application claims the benefit of U.S. Provisional Appl. No. 63/193,287, entitled "SYSTEMS AND METHODS FOR ACCOMMODATING FLEXIBILITY IN SENSING TRANSMISSIONS" and filed May 26, 2021, the entire content of which is incorporated by reference herein.

TECHNICAL FIELD

The present disclosure generally relates to systems and methods for Wi-Fi sensing. In particular, the present disclosure relates to configuring Wi-Fi systems and methods for accommodating flexibility in sensing transmissions during Wi-Fi sensing.

BACKGROUND OF THE DISCLOSURE

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems.

A Wi-Fi sensing system is one recent addition to motion detection systems. The Wi-Fi sensing system may include a sensing device and a remote device. In an example, the sensing device may initiate a Wireless Local Area Network (WLAN) sensing session and the remote device may participate in the WLAN sensing session initiated by the sensing device. The WLAN sensing session may refer to a period during which objects in a physical space may be probed, detected and/or characterized. In an example, during the WLAN sensing session, the sensing device may communicate a requested transmission configuration to the remote device. The requested transmission configuration may describe requirements for Wi-Fi sensing. To deliver requirements of the Wi-Fi sensing, a sensing transmission from the remote device is required for which delivered transmission configuration matches the requested transmission configuration (i.e., the remote device must always accommodate every aspect of the requested sensing configuration when making the sensing transmission, whether or not the sensing transmission is combined with any existing data transmission).

In certain scenarios, the requested transmission configuration may not be compatible with an already-scheduled non-sensing message. For example, if the minimum necessary data transmission configuration and the requested transmission configuration for the sensing transmission are incompatible, then these two transmissions may not be aggregated, and the existing data transmission is sent and a dedicated sensing transmission made according to the requested sensing configuration follows at the next opportunity. This may result into an inefficient use of channel bandwidth as frame aggregation may not be possible. Also, measurement time jitter may occur as it may not be possible to send the transmission configuration from the remote device at the time expected by the sensing device.

BRIEF SUMMARY OF THE DISCLOSURE

The present disclosure generally relates to systems and methods for Wi-Fi sensing. In particular, the present disclosure relates to configuring Wi-Fi systems and methods for accommodating flexibility in sensing transmissions during Wi-Fi sensing.

Systems and methods are provided for Wi-Fi sensing. In an example embodiment, a method configured for Wi-Fi sensing is described. The method is carried out by a sensing initiator device including at least one transmitting antenna, and at least one receiving antenna. The method comprises transmitting, via the at least one transmitting antenna, a sensing measurement setup request message, the sensing measurement setup request message including a requested sensing measurement parameters element, and receiving, via the at least one receiving antenna, a sensing measurement setup response message. In an embodiment the sensing measurement setup response message includes one or more of a transmission capability indication associated with a sensing responder device, and a delivered sensing measurement parameters element.

In some implementations, the requested sensing measurement parameters element includes a plurality of requested transmission parameters to be used for one or more sensing transmissions from the sensing responder device.

In some implementations, the requested sensing measurement parameters element includes a plurality of fields indicating that respective ones of the plurality of requested transmission parameters may be adjusted.

In some implementations, the plurality of requested transmission parameters include one or more of a frequency band parameter, a bandwidth parameter, a channel parameter, a training field parameter, an index identifying a predefined steering matrix configuration, and a steering matrix configuration.

In some implementations, the delivered sensing measurement parameters element includes a plurality of delivered transmission parameters to be used for one or more sensing transmissions from the sensing responder device.

In some implementations, the delivered sensing measurement parameters element includes a plurality of fields indicating that respective ones of the plurality of delivered transmission parameters have been adjusted.

In some implementations, the plurality of delivered transmission parameters includes one or more of a frequency band parameter, a bandwidth parameter, a channel parameter, a training field parameter, a timing configuration, an index identifying a predefined steering matrix configuration, and a steering matrix configuration.

In some implementations, the delivered sensing measurement parameters element differs from the requested sensing measurement parameters element.

In some implementations, one or more of the sensing measurement setup request message and the sensing measurement setup response message are implemented as an IEEE 802.11 Action frame.

In another example embodiment, a method configured for Wi-Fi sensing is described. The method is carried out by a sensing responder device including at least one transmitting antenna, and at least one receiving antenna. The method comprises receiving, via the at least one receiving antenna, a sensing measurement setup request message, the sensing measurement setup request message including a requested sensing measurement parameters element, and transmitting, via the at least one transmitting antenna, a sensing measurement setup response message. In an embodiment the sensing measurement setup response message includes one or more of a transmission capability indication associated with the sensing responder device, and a delivered sensing measurement parameters element.

In another embodiment, a system for Wi-Fi sensing is provided. The system may include a sensing initiator device having at least one transmitting antenna, at least one receiving antenna, and at least one processor, the at least one processor configured for: transmitting, via the at least one transmitting antenna, a sensing measurement setup request message, the sensing measurement setup request message including a requested sensing measurement parameters element; and receiving, via the at least one receiving antenna, a sensing measurement setup response message, wherein the sensing measurement setup response message includes one or more of: a transmission capability indication associated with a sensing responder device, and a delivered sensing measurement parameters element.

In another embodiment, a system for Wi-Fi sensing is provided. The system may include a sensing responder device having at least one receiving antenna, at least one transmitting antenna, and at least one processor, the at least one processor configured for: receiving, via the at least one receiving antenna, a sensing measurement setup request message, the sensing measurement setup request message including a requested sensing measurement parameters element; and transmitting, via the at least one transmitting antenna, a sensing measurement setup response message, wherein the sensing measurement setup response message includes one or more of: a transmission capability indication associated with the sensing responder device, and a delivered sensing measurement parameters element.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
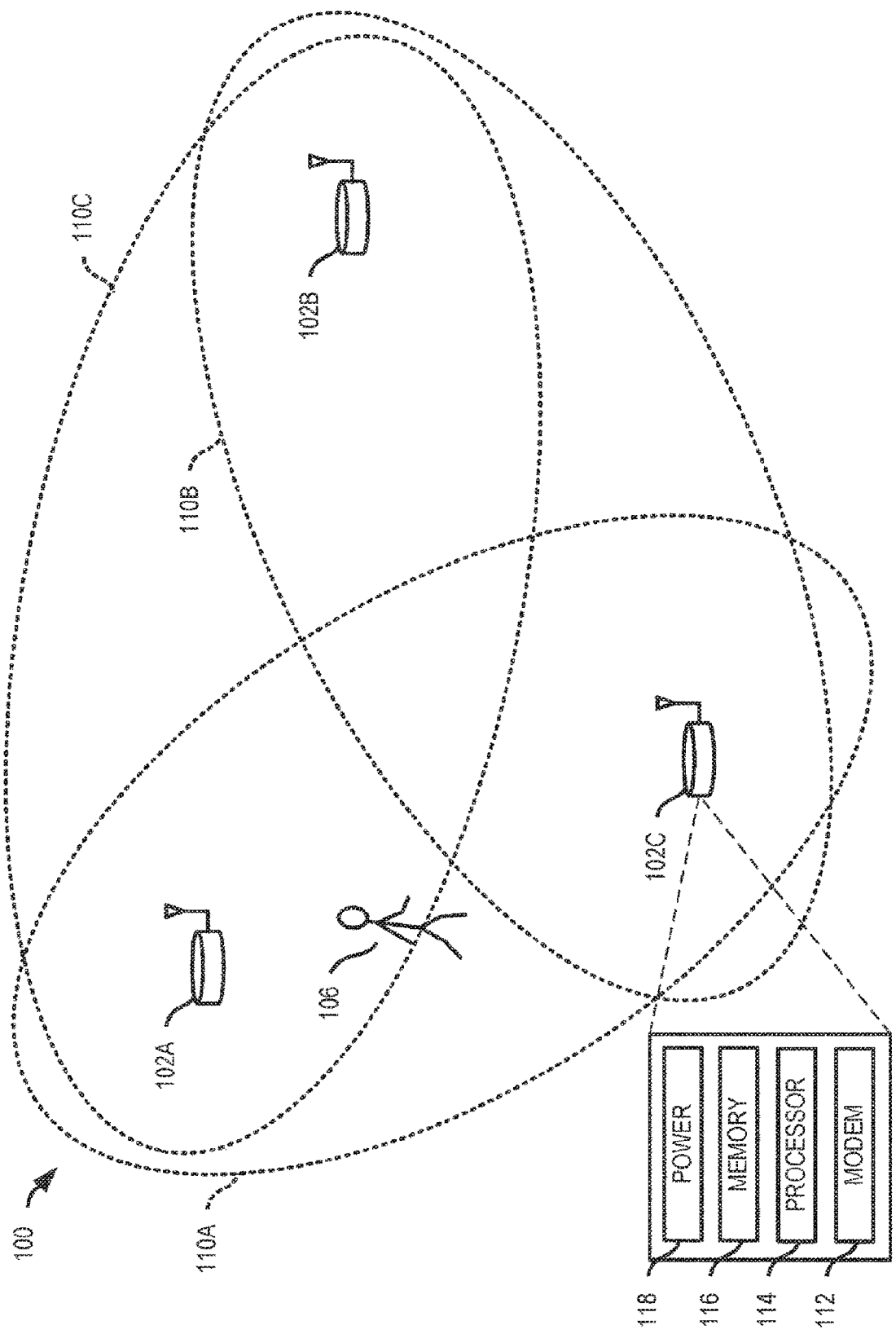
FIG. 1 is a diagram showing an example wireless communication system.

A Wi-Fi sensing system (also referred to as wireless sensing system) may measure an environment by transmitting signal(s) to remote device(s) and analyzing response(s) received from the remote device(s). The Wi-Fi sensing system may perform repeated measurements to analyze the environment and the changes thereof. The Wi-Fi sensing system may operate in conjunction with existing communication components, and benefits from having a Medium Access Control (MAC) layer entity, which may be used for the coordination of air-time resource usage among multiple devices based upon defined protocol.

One of the relevant standardization goals of the Wi-Fi sensing systems is to reduce additional overheads on existing Wi-Fi network, such that overlaying Wi-Fi sensing capability on the 802.11 network does not compromise the communication function of the network. Currently there are no known MAC protocols specifically defined for sensing in the Wi-Fi sensing systems. One aspect of sensing in the Wi-Fi sensing systems is a solicitation of a sensing transmission from a remote device. Improvements to MAC layer to enable solicitation of a sensing transmission from the remote device with characteristics that are optimized to allow the Wi-Fi sensing agent to detect presence, location and motion may significantly impact existing system performance. In particular, the request or solicitation of the remote device transmission optimized for sensing (or a sensing transmission) may impact an uplink scheduler of the remote device. There are existing mechanisms to request or solicit the remote device to transmit the sensing transmission. However, such mechanisms were designed for different purposes. As a result, these mechanisms are not efficient, offer no flexibility in control, and are not universally consistent among different vendor implementations. Furthermore, a channel sounding protocol may be considered for supporting Wi-Fi sensing. However, the channel sounding protocol is not currently flexible and thus, such functionality in support of Wi-Fi sensing is not possible.

Protocols for Wi-Fi systems are designed with decisions made on a basis of the data transfer mechanism as against sensing requirements. As a result, Wi-Fi sensing aspects are frequently not developed within common Wi-Fi systems. With respect to antenna beamforming in the Wi-Fi systems, digital signal processing directs a beam of high antenna gain in the direction of a transmitter or receiver for optimal data transfer purposes and as a result, the antenna pattern may not support or enhance sensing requirements.

In some aspects of what is described herein, a wireless sensing system may be used for a variety of wireless sensing applications by processing wireless signals (e.g., radio frequency signals) transmitted through a space between wireless communication devices. Example wireless sensing applications include motion detection, which can include the following: detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals. As described in more detail below, a wireless sensing system may be configured to control measurement rates, wireless connections and device participation, for example, to improve system operation or to achieve other technical advantages. The system improvements and technical advantages achieved when the wireless sensing system is used for motion detection are also achieved in examples where the wireless sensing system is used for another type of wireless sensing application.

In some example wireless sensing systems, a wireless signal includes a component (e.g., a synchronization preamble in a Wi-Fi PHY frame, or another type of component) that wireless devices can use to estimate a channel response or other channel information, and the wireless sensing system can detect motion (or another characteristic depending on the wireless sensing application) by analyzing changes in the channel information collected over time. In some examples, a wireless sensing system can operate similar to a bistatic radar system, where a Wi-Fi access-point (AP) assumes the receiver role, and each Wi-Fi device (station, node, or peer) connected to the AP assume the transmitter role. The wireless sensing system may trigger a connected device to generate a transmission and produce a channel response measurement at a receiver device. This triggering process can be repeated periodically to obtain a sequence of time variant measurements. A wireless sensing algorithm may then receive the generated time-series of channel response measurements (e.g., computed by Wi-Fi receivers) as input, and through a correlation or filtering process, may then make a determination (e.g., determine if there is motion or no motion within the environment represented by the channel response, for example, based on changes or patterns in the channel estimations). In examples where the wireless sensing system detects motion, it may also be possible to identify a location of the motion within the environment based on motion detection results among a number of wireless devices.

Accordingly, wireless signals received at each of the wireless communication devices in a wireless communication network may be analyzed to determine channel information for the various communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed (e.g., by a hub device or other device in a wireless communication network, or a remote device communicably coupled to the network) to, for example, detect whether motion has occurred in the space, to determine a relative location of the detected motion, or both. In some aspects, the channel information for each of the communication links may be analyzed to detect whether an object is present or absent, e.g., when no motion is detected in the space.

In some cases, a wireless sensing system can control a node measurement rate. For instance, a Wi-Fi motion system may configure variable measurement rates (e.g., channel estimation/environment measurement/sampling rates) based on criteria given by a current wireless sensing application (e.g., motion detection). In some implementations, when no motion is present or detected for a period of time, for example, the wireless sensing system can reduce the rate that the environment is measured, such that the connected device will be triggered less frequently. In some implementations, when motion is present, for example, the wireless sensing system can increase the triggering rate to produce a time-series of measurements with finer time resolution. Controlling the variable measurement rate can allow energy conservation (through the device triggering), reduce processing (less data to correlate or filter), and improve resolution during specified times.

In some cases, a wireless sensing system can perform band steering or client steering of nodes throughout a wireless network, for example, in a Wi-Fi multi-AP or Extended Service Set (ESS) topology, multiple coordinating wireless access-points (APs) each provide a Basic Service Set (BSS) which may occupy different frequency bands and allow devices to transparently move between from one participating AP to another (e.g., mesh). For instance, within a home mesh network, Wi-Fi devices can connect to any of the APs, but typically select one with a good signal strength. The coverage footprint of the mesh APs typically overlap, often putting each device within communication range or more than one AP. If the AP supports multi-bands (e.g., 2.4 GHz and 5 GHz), the wireless sensing system may keep a device connected to the same physical AP, but instruct it to use a different frequency band to obtain more diverse information to help improve the accuracy or results of the wireless sensing algorithm (e.g., motion detection algorithm). In some implementations, the wireless sensing system can change a device from being connected to one mesh AP to being connected to another mesh AP. Such device steering can be performed, for example, during wireless sensing (e.g., motion detection), based on criteria detected in a specific area to improve detection coverage or to better localize motion within an area.

In some cases, beamforming may be performed between wireless communication devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g., as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, many beamforming matrices (e.g., feedback matrices or steering matrices) may be generated to represent a multitude of directions that an object may be located relative to a wireless communication device. These many beamforming matrices may be used to generate the spatial map. The spatial map may be used to detect the presence of motion in the space or to detect a location of the detected motion.

In some instances, a motion detection system can control a variable device measurement rate in a motion detection process. For example, a feedback control system for a multi-node wireless motion detection system may adaptively change the sample rate based on the environment conditions. In some cases, such controls can improve operation of the motion detection system or provide other technical advantages. For example, the measurement rate may be controlled in a manner that optimizes or otherwise improves air-time usage versus detection ability suitable for a wide range of different environments and different motion detection applications. The measurement rate may be controlled in a manner that reduces redundant measurement data to be processed, thereby reducing processor load/power requirements. In some cases, the measurement rate is controlled in a manner that is adaptive, for instance, an adaptive sample can be controlled individually for each participating device. An adaptive sample rate can be used with a tuning control loop for different use cases, or device characteristics.

In some cases, a wireless sensing system can allow devices to dynamically indicate and communicate their wireless sensing capability or wireless sensing willingness to the wireless sensing system. For example, there may be times when a device does not want to be periodically interrupted or triggered to transmit a wireless signal that would allow the AP to produce a channel measurement. For instance, if a device is sleeping, frequently waking the device up to transmit or receive wireless sensing signals could consume resources (e.g., causing a cell-phone battery to discharge faster). These and other events could make a device willing or not willing to participate in wireless sensing system operations. In some cases, a cell phone running on its battery may not want to participate, but when the cell phone is plugged into the charger, it may be willing to participate. Accordingly, if the cell phone is unplugged, it may indicate to the wireless sensing system to exclude the cell phone from participating; whereas if the cell phone is plugged in, it may indicate to the wireless sensing system to include the cell phone in wireless sensing system operations. In some cases, if a device is under load (e.g., a device streaming audio or video) or busy performing a primary function, the device may not want to participate; whereas when the same device's load is reduced and participating will not interfere with a primary function, the device may indicate to the wireless sensing system that it is willing to participate.

Example wireless sensing systems are described below in the context of motion detection (detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications). However, the operation, system improvements, and technical advantages achieved when the wireless sensing system is operating as a motion detection system are also applicable in examples where the wireless sensing system is used for another type of wireless sensing application.

As disclosed in embodiments herein, a wireless local area network (WLAN) sensing procedure allows a station (STA) to perform WLAN sensing. WLAN sensing may include a WLAN sensing session. In examples, WLAN sensing procedure, WLAN sensing, and WLAN sensing session may be referred to as wireless sensing procedure, wireless sensing, and wireless sensing session, Wi-Fi sensing procedure, Wi-Fi sensing, and Wi-Fi sensing session, or sensing procedure, sensing, and sensing session.

WLAN sensing is a service that enables a STA to obtain sensing measurements of the channel(s) between two or more STAs and/or the channel between a receive antenna and a transmit antenna of a STA or an access point (AP). A WLAN sensing procedure may be composed of one or more of the following: sensing session setup, sensing measurement setup, sensing measurement instances, sensing measurement setup termination, and sensing session termination.

In examples disclosed herein, sensing session setup and sensing measurement setup may be referred to as sensing configuration and may be achieved by a sensing configuration message and may be confirmed by a sensing configuration response message. A sensing measurement instance may be an individual sensing measurement and may be derived from a sensing transmission. In examples, the sensing configuration message may be referred to as a sensing measurement setup request, and the sensing configuration response message may be referred to as a sensing measurement setup response.

A WLAN sensing procedure may include multiple sensing measurement instances. In examples, the multiple sensing measurement instances may be referred to a measurement campaign.

A sensing initiator may refer to a STA or an AP that initiates a WLAN sensing procedure. A sensing responder may refer to a STA or an AP that participates in a WLAN sensing procedure initiated by a sensing initiator. A sensing transmitter may refer to a STA or an AP that transmits physical-layer protocol data units (PPDU) used for sensing measurements in a WLAN sensing procedure. A sensing receiver may refer to a STA or an AP that receives PPDUs sent by a sensing transmitter and performs sensing measurements in a WLAN sensing procedure.

In examples, PPDU(s) used for a sensing measurement may be referred to as a sensing transmission.

A STA acting as a sensing initiator may participate in a sensing measurement instance as a sensing transmitter, a sensing receiver, both a sensing transmitter and sensing receiver, or neither a sensing transmitter nor a sensing receiver. A STA acting as a sensing responder may participate in a sensing measurement instance as a sensing transmitter, a sensing receiver, and both a sensing transmitter and a sensing receiver.

In an example, a sensing initiator may be considered to control the WLAN sensing procedure or the measurement campaign. The role of the sensing initiator may be taken on by a sensing device, a remote device, or a separate device which includes a sensing algorithm (for example, a sensing algorithm manager).

In examples, a sensing transmitter may be referred to as a remote device and a sensing receiver may be referred to as a sensing device. In other examples, a sensing initiator may be a function of a sensing device or of a remote device, and a sensing responder may be a function of a sensing device or of a remote device.

IEEE P802.11-REVmd/D5.0 considers a STA to be a physical (PHY) and media access controller (MAC) entity capable of supporting features defined by the specification. A device containing a STA may be referred to as a Wi-Fi device. A Wi-Fi device which manages a basic service set (BSS) (as defined by IEEE P802.11-REVmd/D5.0) may be referred to as an AP STA. A Wi-Fi device which is a client node in a BSS may be referred to as a non-AP STA. In some examples, an AP STA may be referred to as an AP and a non-AP STA may be referred to as a STA.

In various embodiments of the disclosure, non-limiting definitions of one or more terms that will be used in the document are provided below.

A term "measurement campaign" may refer to a bi-directional series of sensing transmissions between a sensing device (commonly known as wireless access-point, Wi-Fi access point, access point, sensing initiator, or sensing receiver) and a remote device (commonly known as Wi-Fi device, sensing responder, or sensing transmitter) that allows a series of sensing measurements to be computed.

A term "message" may refer to any set of data which is transferred from the sensing device to the remote device (or vice versa) during the measurement campaign. The message may be carried in a frame and that frame can be a Medium Access Control (MAC)-layer Protocol Data Unit (MPDU) or an Aggregated MPDU (A-MPDU). The frame in the form of an MPDU or A-MPDU may be transferred from the sensing device to the remote device (or vice versa) as a sensing transmission. In an example, the transmission may be carried out by PHY layer and may be in the form of a PHY-layer Protocol Data Unit (PPDU).

A term "Null Data PPDU (NDP)" may refer to a PPDU that may not include any data field. In an example, the NDP may be used for a sensing transmission where it is a MAC header that includes required information.

A term "Quality of Service (QoS) access category" may refer to an identifier for a frame which classifies a priority of transmission that the frame requires. In an example, four QoS access categories are defined namely AC_VI: Video, AC_VO: Voice, AC_BE: Best-Effort, and AC_BK: Background. Further, each QoS access category may have differing transmission opportunity parameters defined for it.

A term "Timing Synchronization Function (TSF)" may refer to a common timing reference within a set of associated stations, BSS. In an example, the TSF may be kept synchronized by a beacon message transmitted from a shared access point of the BSS. In an example, the timing resolution of TSF may be 1 millisecond.

A term "training field" may refer to a sequence of bits transmitted by the sensing device which is known by the remote device and used on reception to measure channel for purposes other than demodulation of data portion of a containing PPDU. In an example, the training field is included within a preamble of a transmitted PPDU. In some examples, a future training field may be defined within a preamble structure (cascading training fields with legacy support) or it may replace existing training fields (non-legacy support).

A term "transmission opportunity (TXOP)" may refer to an interval of time during which the sensing device or the remote device may have the right to initiate a frame exchange onto a wireless medium.

A term "transmission parameters" may refer to a set of IEEE 802.11 PHY transmitter configuration parameters which are defined as part of transmission vector (TXVECTOR) corresponding to a specific PHY and which are configurable for each PPDU transmission.

A term "requested transmission configuration" may refer to requested transmission parameters of the remote device to be used when sending a sensing transmission. In an example, the requested transmission configuration may include one or more configuration elements, such as IEEE 802.11 elements (IEEE P802.11-REVmd/D5.0, § 9.4.2).

A term "delivered transmission configuration" may refer to transmission parameters applied by the remote device to a sensing transmission. In an example, delivered transmission configuration may include transmission parameters that are supported by the remote device.

A term "sensing transmission" may refer to any transmission made from the remote device to the sensing device which may be used to make a sensing measurement. In an example, sensing transmission may also be referred to as wireless sensing signal or wireless signal.

A term "measurement time jitter" may refer to an inaccuracy which is introduced either when a time of measurement of a sensing measurement is inaccurate or when there is no time of measurement available.

A term "non-sensing message" may refer to any message which is not related to Wi-Fi sensing. In an example, the non-sensing message may include data messages, management messages, and control messages.

A term "requested timing configuration" may refer to a set of timing requirements for sensing transmissions, for example, for a measurement campaign. In an example, timing requirements may be periodic, semi-periodic, and once.

A term "sensing configuration message" may refer to a configuration message that may be used to pre-configure sensing transmissions from the remote device to the sensing device, for example, for a measurement campaign. In examples, the sensing configuration message may be referred to as a sensing measurement setup request.

A term "sensing configuration response message" may refer to a response message to a sensing configuration message that indicates which configuration options are supported by the remote device, for example, transmission capability of the remote device. In an example, the sensing configuration response message may be sent from the remote device to the sensing device in response to the sensing configuration message. In examples, the sensing configuration response message may be referred to as a sensing measurement setup response.

A term "sensing measurement" may refer to a measurement of a state of a channel i.e., CSI measurement between the remote device and the sensing device derived from a sensing transmission. In an example, sensing measurement may also be referred to as channel response measurement.

A term "sensing response message" may refer to a message which is included within a sensing transmission from the remote device to the sensing device. In an example, the sensing transmission that includes the sensing response message may be used to perform a sensing measurement.

A term "sensing response announcement" may refer to a message which is included within a transmission from the remote device to the sensing device that announces that a sensing response NDP will follow after one Short Interframe Spacing (SIFS). The duration of SIFS may be, for example, 10 μs. In an example, the sensing response NDP may be transmitted using the requested transmission configuration. In examples, the term sensing response announcement may be referred to as sensing NDP announcement or sensing NDP announcement frame.

A term "steering matrix configuration" may refer to a matrix of complex values representing real and complex phase required to pre-condition antenna of a Radio Frequency (RF) transmission signal chain for each transmit signal. Application of the steering matrix configuration (for example, by a spatial mapper) enables beamforming and beam-steering.

A term "spatial mapper" may refer to a signal processing element that adjusts an amplitude and a phase of a signal input to an RF transmission signal chain in the remote device. The spatial mapper may include elements to process the signal to each RF transmission signal chain. The operation carried out to adjust the amplitude and the phase of the signal may be referred to as spatial mapping. The output of the spatial mapper is one or more spatial streams.

A term "sensing trigger message" may refer to a message sent from the sensing device to the remote device to trigger one or more sensing transmissions that may be used for performing sensing measurements. In an example, the term sensing trigger message may be referred to as sensing sounding trigger message or sensing sounding trigger frame.

A term "transmission capability" may refer to one or more parameters which indicate transmission capabilities of the remote device. For example, the transmission capability for the remote device may indicate a number of transmitting antennas in the remote device.

A term "broadcast message" may refer to a message that is sent by the sensing device to one or more remote devices that are associated with the sensing device. In an example, the broadcast message may be received and decoded by the one or more remote devices.

A term "Wireless Local Area Network (WLAN) sensing session" may refer to a period during which objects in a physical space may be probed, detected and/or characterized. In an example, during a WLAN sensing session, several devices participate in, and thereby contribute to the generation of sensing measurements.

For purposes of reading the description of the various embodiments below, the following descriptions of the sections of the specifications and their respective contents may be helpful:

Section A describes a wireless communications system, wireless transmissions and sensing measurements which may be useful for practicing embodiments described herein.

Section B describes embodiments of systems and methods for Wi-Fi sensing. In particular, section B describes Wi-Fi systems and methods for accommodating flexibility in sensing transmissions during Wi-Fi sensing.

A. Wireless Communications System, Wireless Transmissions, and Sensing Measurements FIG. 1 illustrates wireless communication system 100. Wireless communication system 100 includes three wireless communication devices: first wireless communication device 102A, second wireless communication device 102B, and third wireless communication device 102C. Wireless communication system 100 may include additional wireless communication devices and other components (e.g., additional wireless communication devices, one or more network servers, network routers, network switches, cables, or other communication links, etc.).

Wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., Bluetooth®, Near Field Communication (NFC), ZigBee), millimeter wave communications, and others.

In some implementations, wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In the example shown in FIG. 1, wireless communication devices 102A, 102B, 102C can be, or they may include standard wireless network components. For example, wireless communication devices 102A, 102B, 102C may be commercially available Wi-Fi access points or another type of wireless access point (WAP) performing one or more operations as described herein that are embedded as instructions (e.g., software or firmware) on the modem of the WAP. In some cases, wireless communication devices 102A, 102B, 102C may be nodes of a wireless mesh network, such as, for example, a commercially available mesh network system (e.g., Plume Wi-Fi, Google Wi-Fi, Qualcomm Wi-Fi SoN, etc.). In some cases, another type of standard or conventional Wi-Fi transmitter device may be used. In some instances, one or more of wireless communication devices 102A, 102B, 102C may be implemented as WAPs in a mesh network, while other wireless communication device(s) 102A, 102B, 102C are implemented as leaf devices (e.g., mobile devices, smart devices, etc.) that access the mesh network through one of the WAPs. In some cases, one or more of wireless communication devices 102A, 102B, 102C is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

Wireless communication devices 102A, 102B, 102C may be implemented without Wi-Fi components; for example, other types of standard or non-standard wireless communication may be used for motion detection. In some cases, wireless communication devices 102A, 102B, 102C can be, or they may be part of, a dedicated motion detection system. For example, the dedicated motion detection system can include a hub device and one or more beacon devices (as remote sensor devices), and wireless communication devices 102A, 102B, 102C can be either a hub device or a beacon device in the motion detection system.

As shown in FIG. 1, wireless communication device 102C includes modem 112, processor 114, memory 116, and power unit 118; any of wireless communication devices 102A, 102B, 102C in wireless communication system 100 may include the same, additional, or different components, and the components may be configured to operate as shown in FIG. 1 or in another manner. In some implementations, modem 112, processor 114, memory 116, and power unit 118 of a wireless communication device are housed together in a common housing or other assembly. In some implementations, one or more of the components of a wireless communication device can be housed separately, for example, in a separate housing or other assembly.

Modem 112 can communicate (receive, transmit, or both) wireless signals. For example, modem 112 may be configured to communicate radio frequency (RF) signals formatted according to a wireless communication standard (e.g., Wi-Fi or Bluetooth). Modem 112 may be implemented as the example wireless network modem 112 shown in FIG. 1, or may be implemented in another manner, for example, with other types of components or subsystems. In some implementations, modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in modem 112 can include one or more antennas and radio frequency circuitry. The radio frequency circuitry can include, for example, circuitry that filters, amplifies, or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in modem 112 receives baseband signals from the baseband subsystem, up-converts the baseband signals to radio frequency (RF) signals, and wirelessly transmits the radio frequency signals (e.g., through an antenna). In some instances, the radio subsystem in modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of modem 112 can communicate wireless network traffic (e.g., data packets) in the wireless communication network through the radio subsystem on one or more network traffic channels. The baseband subsystem of modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

Processor 114 can execute instructions, for example, to generate output data based on data inputs. The instructions can include programs, codes, scripts, or other types of data stored in memory. Additionally, or alternatively, the instructions can be encoded as pre-programmed or re-programmable logic circuits, logic gates, or other types of hardware or firmware components. Processor 114 may be or include a general-purpose microprocessor, as a specialized co-processor or another type of data processing apparatus. In some cases, processor 114 performs high level operation of the wireless communication device 102C. For example, processor 114 may be configured to execute or interpret software, scripts, programs, functions, executables, or other instructions stored in memory 116. In some implementations, processor 114 may be included in modem 112.

Memory 116 can include computer-readable storage media, for example, a volatile memory device, a nonvolatile memory device, or both. Memory 116 can include one or more read-only memory devices, random-access memory devices, buffer memory devices, or a combination of these and other types of memory devices. In some instances, one or more components of the memory can be integrated or otherwise associated with another component of wireless communication device 102C. Memory 116 may store instructions that are executable by processor 114. For example, the instructions may include instructions for time-aligning signals using an interference buffer and a motion detection buffer, such as through one or more of the operations of the example processes as described in any of FIG. 7 to FIG. 12.

Power unit 118 provides power to the other components of wireless communication device 102C. For example, the other components may operate based on electrical power provided by power unit 118 through a voltage bus or other connection. In some implementations, power unit 118 includes a battery or a battery system, for example, a rechargeable battery. In some implementations, power unit 118 includes an adapter (e.g., an AC adapter) that receives an external power signal (from an external source) and coverts the external power signal to an internal power signal conditioned for a component of wireless communication device 102C. Power unit 118 may include other components or operate in another manner.

In the example shown in FIG. 1, wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as wireless communication device 102C may receive the wireless signals transmitted by wireless communication devices 102A, 102B. In some cases, the wireless signals transmitted by wireless communication devices 102A, 102B are repeated periodically, for example, according to a wireless communication standard or otherwise.

In the example shown, wireless communication device 102C processes the wireless signals from wireless communication devices 102A, 102B to detect motion of an object in a space accessed by the wireless signals, to determine a location of the detected motion, or both. For example, wireless communication device 102C may perform one or more operations of the example processes described below with respect to any of FIG. 7 to FIG. 12, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that wireless communication device 102C can transmit wireless signals and wireless communication devices 102A, 102B can processes the wireless signals from wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In examples, motion detection may be carried out by analyzing one or more training fields carried by the wireless signals or by analyzing other data carried by the signal. In some examples data will be added for the express purpose of motion detection or the data used will nominally be for another purpose and reused or repurposed for motion detection. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, wireless communication device 102C may generate motion detection data. In some instances, wireless communication device 102C may communicate the motion detection data to another device or system, such as a security system, which may include a control center for monitoring movement within a space, such as a room, building, outdoor area, etc.

In some implementations, wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by wireless communication device 102C, which may reduce the amount of processing that wireless communication device 102C performs for motion sensing. The header may include additional information such as, for example, an indication of whether motion was detected by another device in communication system 100, an indication of the modulation type, an identification of the device transmitting the signal, etc.

In the example shown in FIG. 1, wireless communication system 100 is a wireless mesh network, with wireless communication links between each of wireless communication devices 102. In the example shown, the wireless communication link between wireless communication device 102C and wireless communication device 102A can be used to probe motion detection field 110A, the wireless communication link between wireless communication device 102C and wireless communication device 102B can be used to probe motion detection field 110B, and the wireless communication link between wireless communication device 102A and wireless communication device 102B can be used to probe motion detection field 110C. In some instances, each wireless communication device 102 detects motion in motion detection fields 110 accessed by that device by processing received signals that are based on wireless signals transmitted by wireless communication devices 102 through motion detection fields 110. For example, when person 106 shown in FIG. 1 moves in motion detection field 110A and motion detection field 110C, wireless communication devices 102 may detect the motion based on signals they received that are based on wireless signals transmitted through respective motion detection fields 110. For instance, wireless communication device 102A can detect motion of person 106 in motion detection fields 110A, 110C, wireless communication device 102B can detect motion of person 106 in motion detection field 110C, and wireless communication device 102C can detect motion of person 106 in motion detection field 110A.

In some instances, motion detection fields 110 can include, for example, air, solid materials, liquids, or another medium through which wireless electromagnetic signals may propagate. In the example shown in FIG. 1, motion detection field 110A provides a wireless communication channel between wireless communication device 102A and wireless communication device 102C, motion detection field 110B provides a wireless communication channel between wireless communication device 102B and wireless communication device 102C, and motion detection field 110C provides a wireless communication channel between wireless communication device 102A and wireless communication device 102B. In some aspects of operation, wireless signals transmitted on a wireless communication channel (separate from or shared with the wireless communication channel for network traffic) are used to detect movement of an object in a space. The objects can be any type of static or moveable object and can be living or inanimate. For example, the object can be a human (e.g., person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of wireless communication devices 102 (or another device communicably coupled to wireless communications devices 102) may determine that the detected motion is nearby a particular wireless communication device.

Figure 2A:
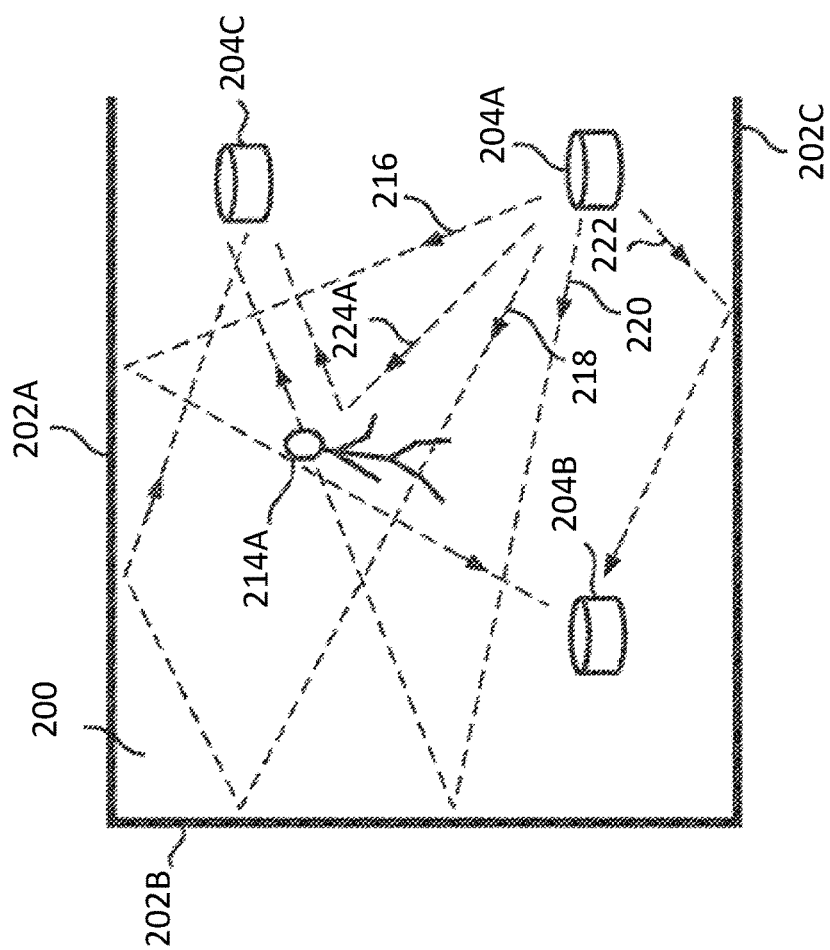
FIG. 2A and FIG. 2B are diagrams showing example wireless signals communicated between wireless communication devices.
Figure 2B:
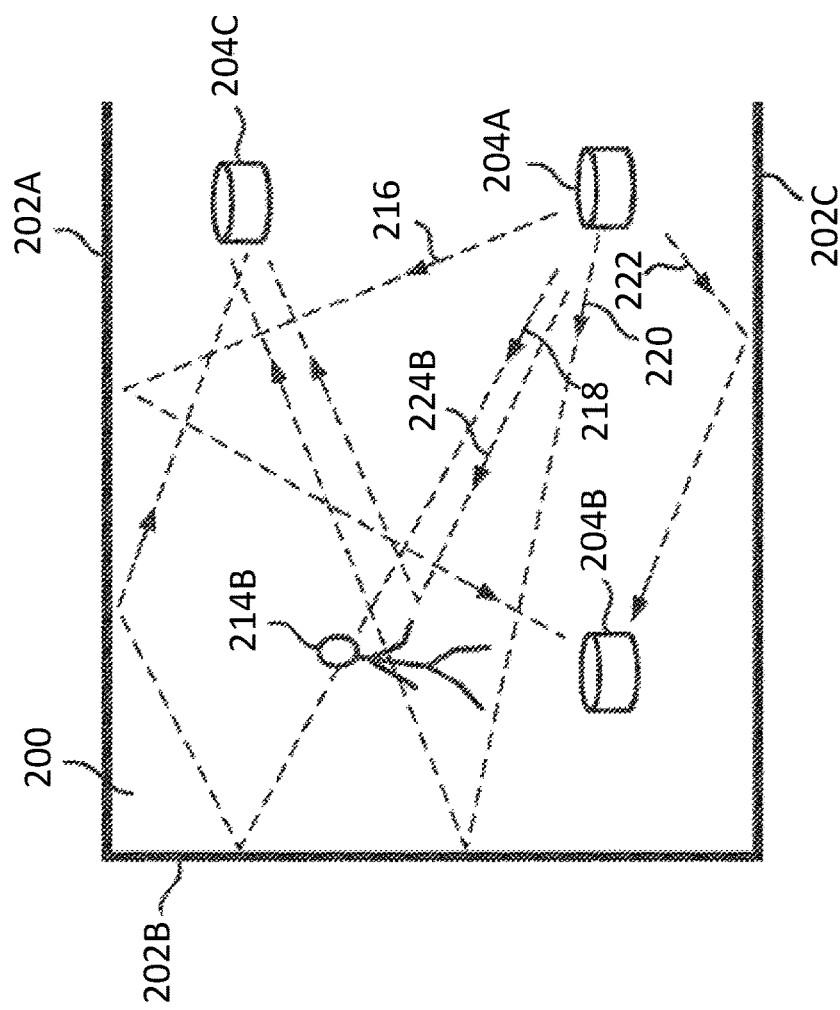

FIG. 2A and FIG. 2B are diagrams showing example wireless signals communicated between wireless communication devices 204A, 204B, 204C. Wireless communication devices 204A, 204B, 204C can be, for example, wireless communication devices 102A, 102B, 102C shown in FIG. 1, or other types of wireless communication devices. Wireless communication devices 204A, 204B, 204C transmit wireless signals through space 200. Space 200 can be completely or partially enclosed or open at one or more boundaries. In an example, space 200 may be a sensing space. Space 200 can be or can include an interior of a room, multiple rooms, a building, an indoor area, outdoor area, or the like. First wall 202A, second wall 202B, and third wall 202C at least partially enclose space 200 in the example shown.

In the example shown in FIG. 2A and FIG. 2B, wireless communication device 204A is operable to transmit wireless signals repeatedly (e.g., periodically, intermittently, at scheduled, unscheduled, or random intervals, etc.). Wireless communication devices 204B, 204C are operable to receive signals based on those transmitted by wireless communication device 204A. Wireless communication devices 204B, 204C each have a modem (e.g., modem 112 shown in FIG. 1) that is configured to process received signals to detect motion of an object in space 200.

As shown, an object is in first position 214A in FIG. 2A, and the object has moved to second position 214B in FIG. 2B. In FIG. 2A and FIG. 2B, the moving object in space 200 is represented as a human, but the moving object can be another type of object. For example, the moving object can be an animal, an inorganic object (e.g., a system, device, apparatus, or assembly), an object that defines all or part of the boundary of space 200 (e.g., a wall, door, window, etc.), or another type of object.

As shown in FIG. 2A and FIG. 2B, multiple example paths of the wireless signals transmitted from wireless communication device 204A are illustrated by dashed lines. Along first signal path 216, the wireless signal is transmitted from wireless communication device 204A and reflected off first wall 202A toward the wireless communication device 204B. Along second signal path 218, the wireless signal is transmitted from the wireless communication device 204A and reflected off second wall 202B and first wall 202A toward wireless communication device 204C. Along third signal path 220, the wireless signal is transmitted from the wireless communication device 204A and reflected off second wall 202B toward wireless communication device 204C. Along fourth signal path 222, the wireless signal is transmitted from the wireless communication device 204A and reflected off third wall 202C toward the wireless communication device 204B.

In FIG. 2A, along fifth signal path 224A, the wireless signal is transmitted from wireless communication device 204A and reflected off the object at first position 214A toward wireless communication device 204C. Between FIG. 2A and FIG. 2B, a surface of the object moves from first position 214A to second position 214B in space 200 (e.g., some distance away from first position 214A). In FIG. 2B, along sixth signal path 224B, the wireless signal is transmitted from wireless communication device 204A and reflected off the object at second position 214B toward wireless communication device 204C. Sixth signal path 224B depicted in FIG. 2B is longer than fifth signal path 224A depicted in FIG. 2A due to the movement of the object from first position 214A to second position 214B. In some examples, a signal path can be added, removed, or otherwise modified due to movement of an object in a space.

The example wireless signals shown in FIG. 2A and FIG. 2B may experience attenuation, frequency shifts, phase shifts, or other effects through their respective paths and may have portions that propagate in another direction, for example, through the first, second and third walls 202A, 202B, and 202C. In some examples, the wireless signals are radio frequency (RF) signals. The wireless signals may include other types of signals.

In the example shown in FIG. 2A and FIG. 2B, wireless communication device 204A can repeatedly transmit a wireless signal. In particular, FIG. 2A shows the wireless signal being transmitted from wireless communication device 204A at a first time, and FIG. 2B shows the same wireless signal being transmitted from wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from wireless communication device 204A in an omnidirectional manner, in a directional manner or otherwise. In the example shown, the wireless signals traverse multiple respective paths in space 200, and the signal along each path may become attenuated due to path losses, scattering, reflection, or the like and may have a phase or frequency offset.

As shown in FIG. 2A and FIG. 2B, the signals from first to sixth paths 216, 218, 220, 222, 224A, and 224B combine at wireless communication device 204C and wireless communication device 204B to form received signals. Because of the effects of the multiple paths in space 200 on the transmitted signal, space 200 may be represented as a transfer function (e.g., a filter) in which the transmitted signal is input and the received signal is output. When an object moves in space 200, the attenuation or phase offset affected upon a signal in a signal path can change, and hence, the transfer function of space 200 can change. Assuming the same wireless signal is transmitted from wireless communication device 204A, if the transfer function of space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t)=\Sigma_{n=-\infty}^{\infty} c_n e^{j\omega_n t} \quad (1)$$

Where $\omega n$ represents the frequency of nth frequency component of the transmitted signal, $c_n$ represents the complex coefficient of the nth frequency component, and t represents time. With the transmitted signal f(t) being transmitted from the first wireless communication device 204A, an output signal $r_k(t)$ from a path k may be described according to Equation (2):

$$r_k(t)=\Sigma_{n=-\infty}^{\infty} \alpha_{n,k} c_n e^{j(\omega_n t + \phi_{n,k})} \quad (2)$$

Where $\alpha_{n,k}$ represents an attenuation factor (or channel response; e.g., due to scattering, reflection, and path losses) for the nth frequency component along path k, and $\phi_{n,k}$ represents the phase of the signal for nth frequency component along path k. Then, the received signal R at a wireless communication device can be described as the summation of all output signals $r_k(t)$ from all paths to the wireless communication device, which is shown in Equation (3):

$$R=\Sigma_k r_k(t) \quad (3)$$

Substituting Equation (2) into Equation (3) renders the following Equation (4):

$$R=\Sigma_k \Sigma_{n=-\infty}^{\infty} (\alpha_{n,k} e^{j\phi_{n,k}}) c_n e^{j\omega_n t} \quad (4)$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n=\Sigma_k c_n \alpha_{n,k} e^{j\phi_{n,k}} \quad (5)$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as follows in Equation (6):

$$h_{ch}=\Sigma_k \Sigma_{n=-\infty}^{\infty} \alpha_{n,k} \quad (6)$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as follows in Equation (7):

$$R_{cvd}=R_{ef} \otimes h_{ch}=\Sigma_{k=-m}^{m} R_{ef}(n-k) h_{ch}(k) \quad (7)$$

with the optimization criterion $$\min_{h_{ch}} \sum (\hat{R}_{cvd} - R_{cvd})^2$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like. As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

Figure 3A:
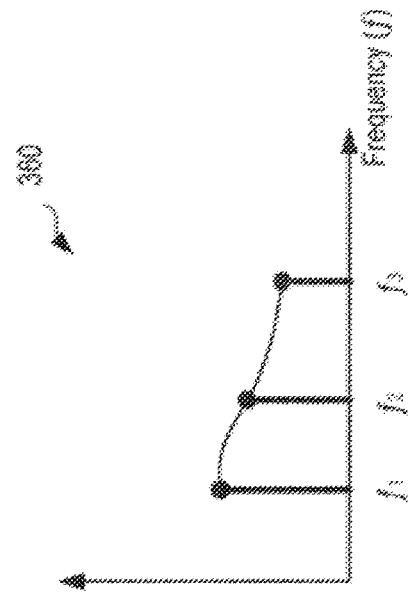
FIG. 3A and FIG. 3B are plots showing examples of channel responses computed from the wireless signals communicated between wireless communication devices in FIG. 2A and FIG. 2B.
Figure 3A:
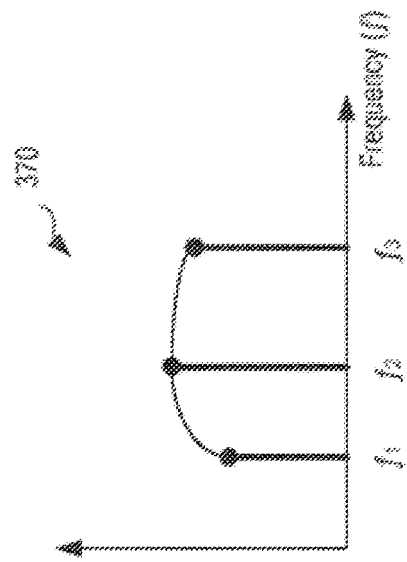
Figure 3B:
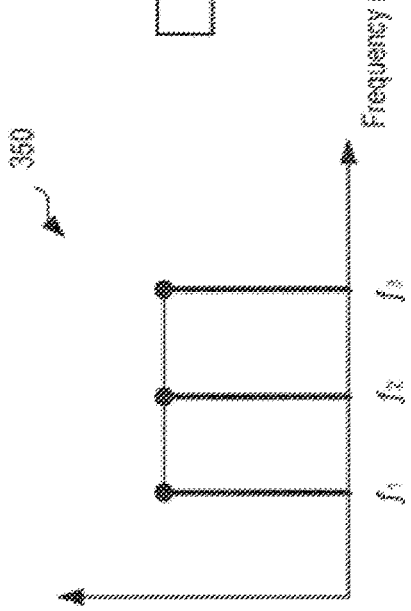
Figure 3B:
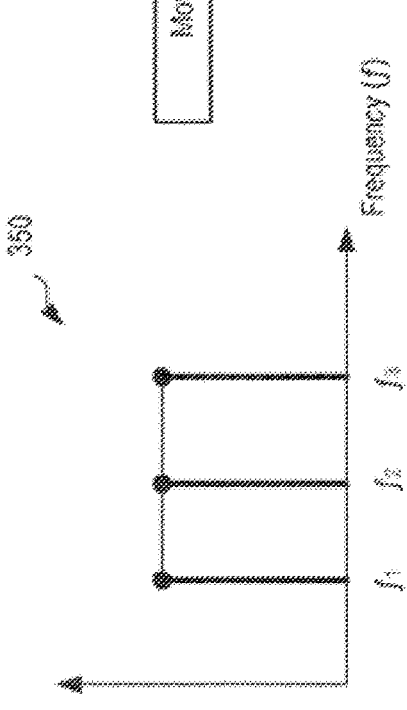

FIG. 3A and FIG. 3B are plots showing examples of channel response 360 and channel response 370 computed from the wireless signals communicated between wireless communication devices 204A, 204B, 204C in FIG. 2A and FIG. 2B. FIG. 3A and FIG. 3B also show frequency domain representation 350 of an initial wireless signal transmitted by wireless communication device 204A. In the examples shown, channel response 360 in FIG. 3A represents the signals received by wireless communication device 204B when there is no motion in space 200, and channel response 370 in FIG. 3B represents the signals received by wireless communication device 204B in FIG. 2B after the object has moved in space 200.

In the example shown in FIG. 3A and FIG. 3B, for illustration purposes, wireless communication device 204A transmits a signal that has a flat frequency profile (the magnitude of each frequency component $f_1$, $f_2$, and $f_3$ is the same), as shown in frequency domain representation 350. Because of the interaction of the signal with space 200 (and the objects therein), the signals received at wireless communication device 204B that are based on the signal sent from wireless communication device 204A are different from the transmitted signal. In this example, where the transmitted signal has a flat frequency profile, the received signal represents the channel response of space 200. As shown in FIG. 3A and FIG. 3B, channel response 360 and channel response 370 are different from frequency domain representation 350 of the transmitted signal. When motion occurs in space 200, a variation in the channel response will also occur. For example, as shown in FIG. 3B, channel response 370 that is associated with motion of object in space 200 varies from channel response 360 that is associated with no motion in space 200.

Furthermore, as an object moves within space 200, the channel response may vary from channel response 370. In some cases, space 200 can be divided into distinct regions and the channel responses associated with each region may share one or more characteristics (e.g., shape), as described below. Thus, motion of an object within different distinct regions can be distinguished, and the location of detected motion can be determined based on an analysis of channel responses.

Figure 4A:
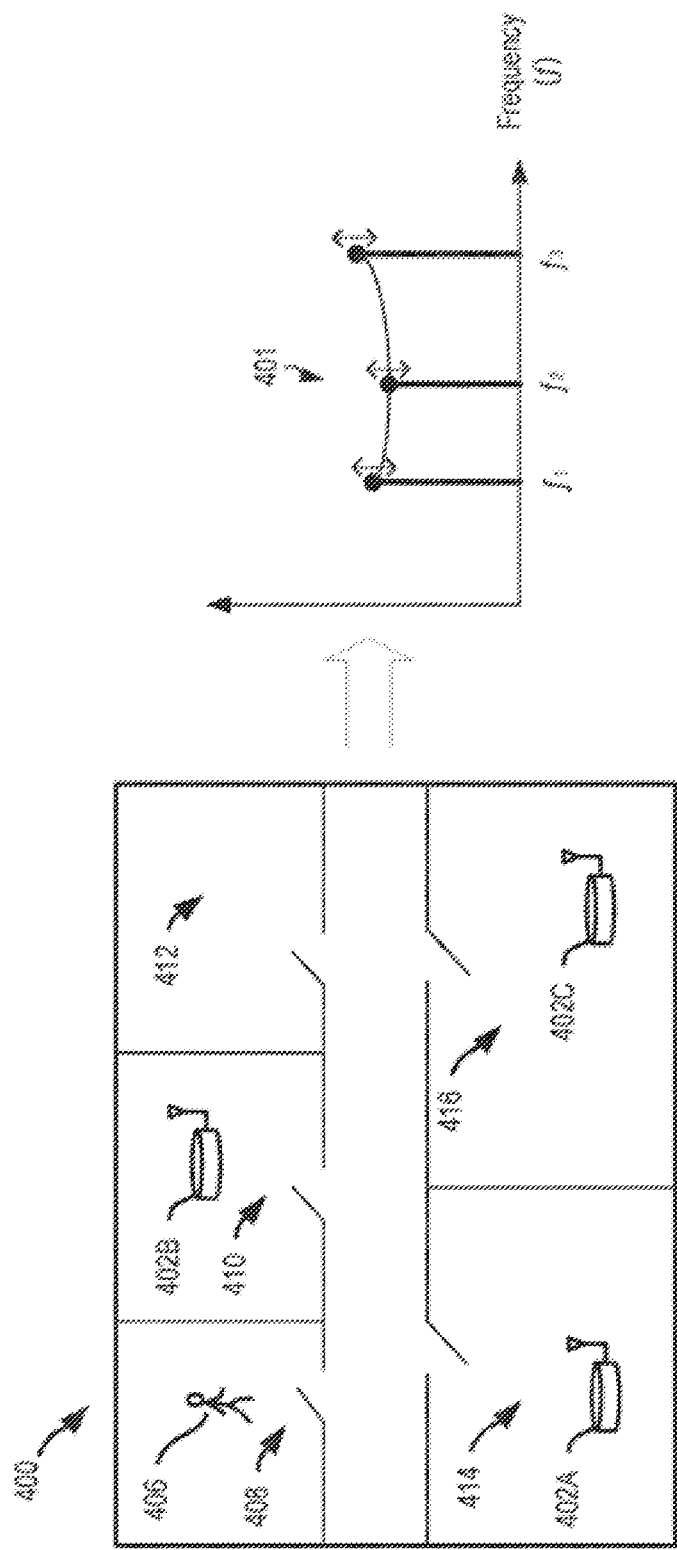
FIG. 4A and FIG. 4B are diagrams showing example channel responses associated with motion of an object in distinct regions of a space.
Figure 4B:
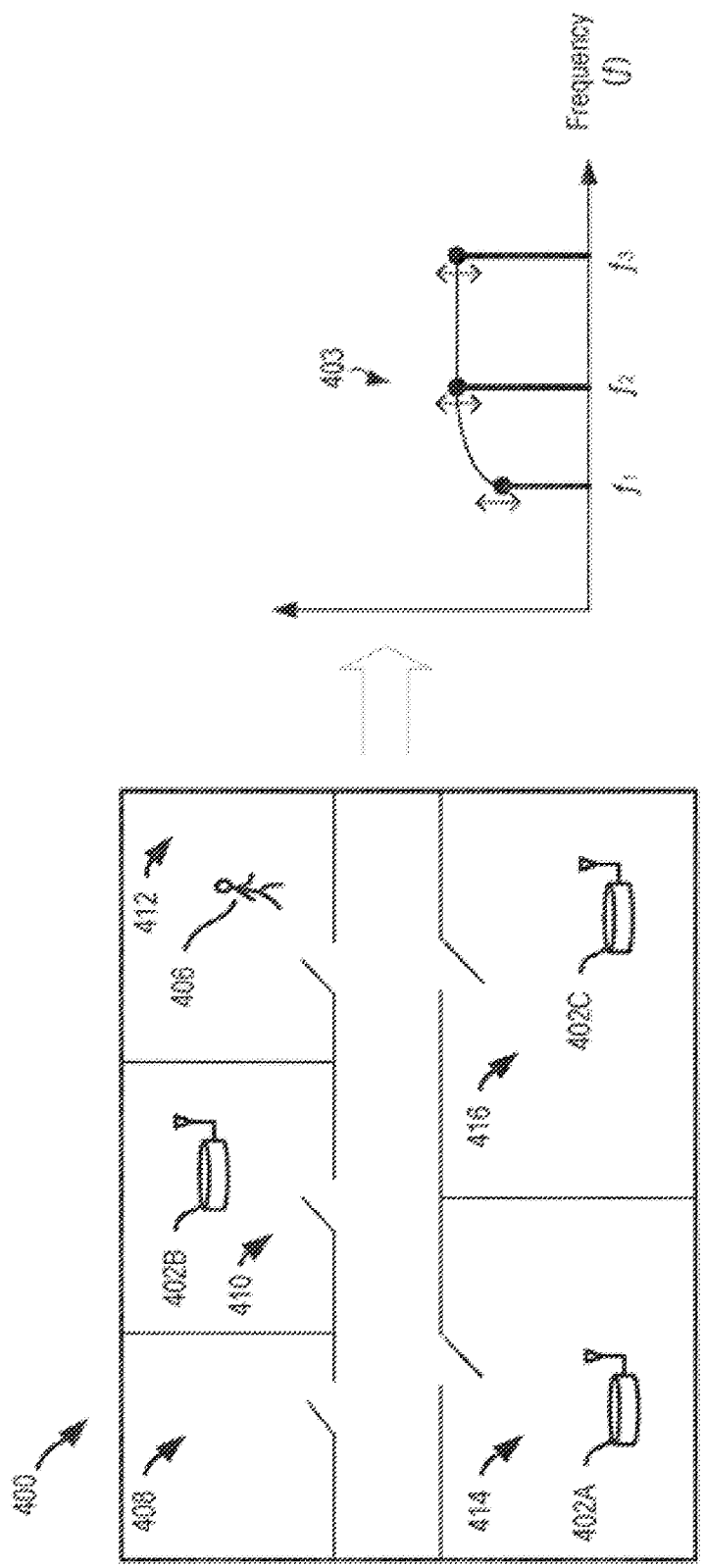

FIG. 4A and FIG. 4B are diagrams showing example channel response 401 and channel response 403 associated with motion of object 406 in distinct regions, first region 408 and third region 412 of space 400. In the examples shown, space 400 is a building, and space 400 is divided into a plurality of distinct regions—first region 408, second region 410, third region 412, fourth region 414, and fifth region 416. Space 400 may include additional or fewer regions, in some instances. As shown in FIG. 4A and FIG. 4B, the regions within space 400 may be defined by walls between rooms. In addition, the regions may be defined by ceilings between floors of a building. For example, space 400 may include additional floors with additional rooms. In addition, in some instances, the plurality of regions of a space can be or include a number of floors in a multistory building, a number of rooms in the building, or a number of rooms on a particular floor of the building. In the example shown in FIG. 4A, an object located in first region 408 is represented as person 406, but the moving object can be another type of object, such as an animal or an inorganic object.

In the example shown, wireless communication device 402A is located in fourth region 414 of space 400, wireless communication device 402B is located in second region 410 of space 400, and wireless communication device 402C is located in fifth region 416 of space 400. Wireless communication devices 402 can operate in the same or similar manner as wireless communication devices 102 of FIG. 1. For instance, wireless communication devices 402 may be configured to transmit and receive wireless signals and detect whether motion has occurred in space 400 based on the received signals. As an example, wireless communication devices 402 may periodically or repeatedly transmit motion probe signals through space 400, and receive signals based on the motion probe signals. Wireless communication devices 402 can analyze the received signals to detect whether an object has moved in space 400, such as, for example, by analyzing channel responses associated with space 400 based on the received signals. In addition, in some implementations, wireless communication devices 402 can analyze the received signals to identify a location of detected motion within space 400. For example, wireless communication devices 402 can analyze characteristics of the channel response to determine whether the channel responses share the same or similar characteristics to channel responses known to be associated with first to fifth regions 408, 410, 412, 414, 416 of space 400.

In the examples shown, one (or more) of wireless communication devices 402 repeatedly transmits a motion probe signal (e.g., a reference signal) through space 400. The motion probe signals may have a flat frequency profile in some instances, wherein the magnitude of $f_1$, $f_2$, and $f_3$ is the same or nearly the same. For example, the motion probe signals may have a frequency response similar to frequency domain representation 350 shown in FIGS. 3A-3B. The motion probe signals may have a different frequency profile in some instances. Because of the interaction of the reference signal with space 400 (and the objects therein), the signals received at another wireless communication device 402 that are based on the motion probe signal transmitted from the other wireless communication device 402 are different from the transmitted reference signal.

Based on the received signals, wireless communication devices 402 can determine a channel response for space 400. When motion occurs in distinct regions within the space, distinct characteristics may be seen in the channel responses. For example, while the channel responses may differ slightly for motion within the same region of space 400, the channel responses associated with motion in distinct regions may generally share the same shape or other characteristics. For instance, channel response 401 of FIG. 4A represents an example channel response associated with motion of object 406 in first region 408 of space 400, while channel response 403 of FIG. 4B represents an example channel response associated with motion of object 406 in third region 412 of space 400. Channel response 401 and channel response 403 are associated with signals received by the same wireless communication device 402 in space 400.

Figure 4C:
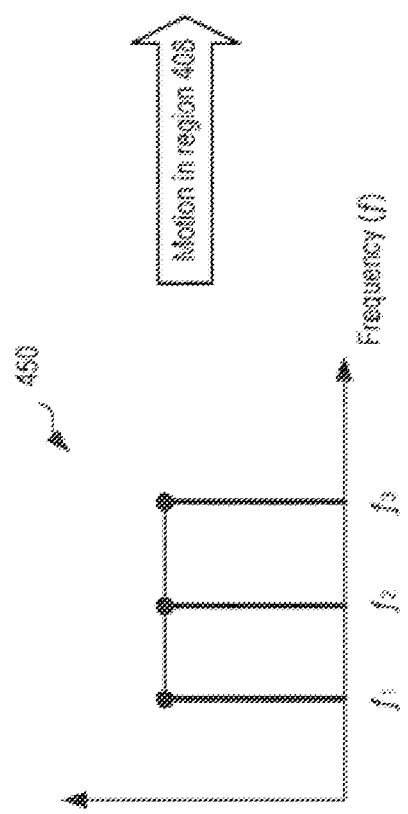
FIG. 4C and FIG. 4D are plots showing the example channel responses of FIG. 4A and FIG. 4B overlaid on an example channel response associated with no motion occurring in the space.
Figure 4C:
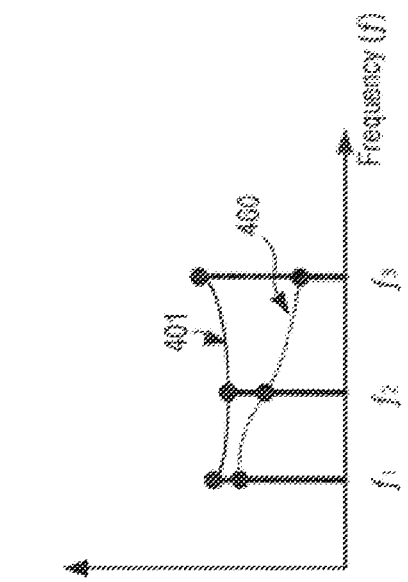
Figure 4D:
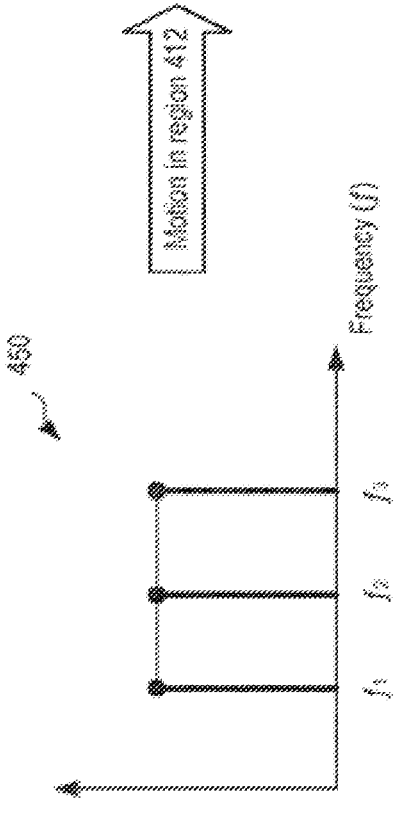
Figure 4D:
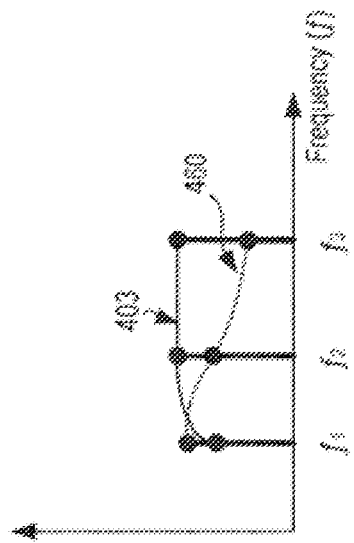

FIG. 4C and FIG. 4D are plots showing channel response 401 and channel response 403 of FIG. 4A and FIG. 4B overlaid on channel response 460 associated with no motion occurring in space 400. In the example shown, wireless communication device 402 transmits a motion probe signal that has a flat frequency profile as shown in frequency domain representation 450. When motion occurs in space 400, a variation in the channel response will occur relative to channel response 460 associated with no motion, and thus, motion of an object in space 400 can be detected by analyzing variations in the channel responses. In addition, a relative location of the detected motion within space 400 can be identified. For example, the shape of channel responses associated with motion can be compared with reference information (e.g., using a trained AI model) to categorize the motion as having occurred within a distinct region of space 400.

When there is no motion in space 400 (e.g., when object 406 is not present), wireless communication device 402 may compute channel response 460 associated with no motion. Slight variations may occur in the channel response due to a number of factors; however, multiple channel responses 460 associated with different periods of time may share one or more characteristics. In the example shown, channel response 460 associated with no motion has a decreasing frequency profile (the magnitude of each frequency component $f_1$, $f_2$, and $f_3$ is less than the previous). The profile of channel response 460 may differ in some instances (e.g., based on different room layouts or placement of wireless communication devices 402).

When motion occurs in space 400, a variation in the channel response will occur. For instance, in the examples shown in FIG. 4C and FIG. 4D, channel response 401 associated with motion of object 406 in first region 408 differs from channel response 460 associated with no motion and channel response 403 associated with motion of object 406 in third region 412 differs from channel response 460 associated with no motion. Channel response 401 has a concave-parabolic frequency profile (the magnitude of the middle frequency component $f_2$ is less than the outer frequency components $f_1$ and $f_3$), while channel response 403 has a convex-asymptotic frequency profile (the magnitude of the middle frequency component $f_2$ is greater than the outer frequency components $f_1$ and $f_3$). The profiles of channel responses 401, 403 may differ in some instances (e.g., based on different room layouts or placement of the wireless communication devices 402).

Analyzing channel responses may be considered similar to analyzing a digital filter. A channel response may be formed through the reflections of objects in a space as well as reflections created by a moving or static human. When a reflector (e.g., a human) moves, it changes the channel response. This may translate to a change in equivalent taps of a digital filter, which can be thought of as having poles and zeros (poles amplify the frequency components of a channel response and appear as peaks or high points in the response, while zeros attenuate the frequency components of a channel response and appear as troughs, low points, or nulls in the response). A changing digital filter can be characterized by the locations of its peaks and troughs, and a channel response may be characterized similarly by its peaks and troughs. For example, in some implementations, analyzing nulls and peaks in the frequency components of a channel response (e.g., by marking their location on the frequency axis and their magnitude), motion can be detected.

In some implementations, a time series aggregation can be used to detect motion. A time series aggregation may be performed by observing the features of a channel response over a moving window and aggregating the windowed result by using statistical measures (e.g., mean, variance, principal components, etc.). During instances of motion, the characteristic digital-filter features would be displaced in location and flip-flop between some values due to the continuous change in the scattering scene. That is, an equivalent digital filter exhibits a range of values for its peaks and nulls (due to the motion). By looking this range of values, unique profiles (in examples profiles may also be referred to as signatures) may be identified for distinct regions within a space.

In some implementations, an artificial intelligence (AI) model may be used to process data. AI models may be of a variety of types, for example linear regression models, logistic regression models, linear discriminant analysis models, decision tree models, naïve bayes models, K-nearest neighbor models, learning vector quantization models, support vector machines, bagging and random forest models, and deep neural networks. In general, all AI models aim to learn a function which provides the most precise correlation between input values and output values and are trained using historic sets of inputs and outputs that are known to be correlated. In examples, artificial intelligence may also be referred to as machine learning.

In some implementations, the profiles of the channel responses associated with motion in distinct regions of space 400 can be learned. For example, machine learning may be used to categorize channel response characteristics with motion of an object within distinct regions of a space. In some cases, a user associated with wireless communication devices 402 (e.g., an owner or other occupier of space 400) can assist with the learning process. For instance, referring to the examples shown in FIG. 4A and FIG. 4B, the user can move in each of first to fifth regions 408, 410, 412, 414, 416 during a learning phase and may indicate (e.g., through a user interface on a mobile computing device) that he/she is moving in one of the particular regions in space 400. For example, while the user is moving through first region 408 (e.g., as shown in FIG. 4A) the user may indicate on a mobile computing device that he/she is in first region 408 (and may name the region as "bedroom", "living room", "kitchen", or another type of room of a building, as appropriate). Channel responses may be obtained as the user moves through the region, and the channel responses may be "tagged" with the user's indicated location (region). The user may repeat the same process for the other regions of space 400. The term "tagged" as used herein may refer to marking and identifying channel responses with the user's indicated location or any other information.

The tagged channel responses can then be processed (e.g., by machine learning software) to identify unique characteristics of the channel responses associated with motion in the distinct regions. Once identified, the identified unique characteristics may be used to determine a location of detected motion for newly computed channel responses. For example, an AI model may be trained using the tagged channel responses, and once trained, newly computed channel responses can be input to the AI model, and the AI model can output a location of the detected motion. For example, in some cases, mean, range, and absolute values are input to an AI model. In some instances, magnitude and phase of the complex channel response itself may be input as well. These values allow the AI model to design arbitrary front-end filters to pick up the features that are most relevant to making accurate predictions with respect to motion in distinct regions of a space. In some implementations, the AI model is trained by performing a stochastic gradient descent. For instance, channel response variations that are most active during a certain zone may be monitored during the training, and the specific channel variations may be weighted heavily (by training and adapting the weights in the first layer to correlate with those shapes, trends, etc.). The weighted channel variations may be used to create a metric that activates when a user is present in a certain region.

For extracted features like channel response nulls and peaks, a time-series (of the nulls/peaks) may be created using an aggregation within a moving window, taking a snapshot of few features in the past and present, and using that aggregated value as input to the network. Thus, the network, while adapting its weights, will be trying to aggregate values in a certain region to cluster them, which can be done by creating a logistic classifier based decision surfaces. The decision surfaces divide different clusters and subsequent layers can form categories based on a single cluster or a combination of clusters.

In some implementations, an AI model includes two or more layers of inference. The first layer acts as a logistic classifier which can divide different concentration of values into separate clusters, while the second layer combines some of these clusters together to create a category for a distinct region. Additional, subsequent layers can help in extending the distinct regions over more than two categories of clusters. For example, a fully-connected AI model may include an input layer corresponding to the number of features tracked, a middle layer corresponding to the number of effective clusters (through iterating between choices), and a final layer corresponding to different regions. Where complete channel response information is input to the AI model, the first layer may act as a shape filter that can correlate certain shapes. Thus, the first layer may lock to a certain shape, the second layer may generate a measure of variation happening in those shapes, and third and subsequent layers may create a combination of those variations and map them to different regions within the space. The output of different layers may then be combined through a fusing layer.

B. Systems and Methods for Accommodating Flexibility in Sensing Transmissions The present disclosure generally relates to systems and methods for Wi-Fi sensing. In particular, the present disclosure relates to configuring Wi-Fi systems and methods for accommodating flexibility in sensing transmissions during Wi-Fi sensing.

The systems and the methods provide solutions by which configuration and triggering of a sensing transmission may be made to allow for defined levels of flexibility in the resulting sensing transmission such that the sensing transmission may be aggregated with data transmissions, resulting in a lower impact of sensing transmissions. In an example, full flexibility is allowed, and a sensing transmission is effectively possible from any non-sensing message via aggregation.

The system and method of the present disclosure leverage a sensing device that may be configured to control a measurement campaign. In an implementation, the system and the method also leverage one or more remote devices. The one or more remote devices may be configured to make sensing transmissions and the sensing device may be configured to compute sensing measurements based on the sensing transmissions. In an implementation, the sensing measurements may be further processed for the purpose of achieving the objectives of the measurement campaign.

According to an implementation, the sensing device may initiate a WLAN sensing session and the one or more remote devices may participate in the WLAN sensing session initiated by the sensing device. In some implementations, the one or more remote devices may transmit PPDUs which are used for sensing measurements in the WLAN sensing session. In an implementation, the sensing device may receive the PPDUs in the WLAN sensing session and process the PPDUs into the sensing measurements.

Figure 5:
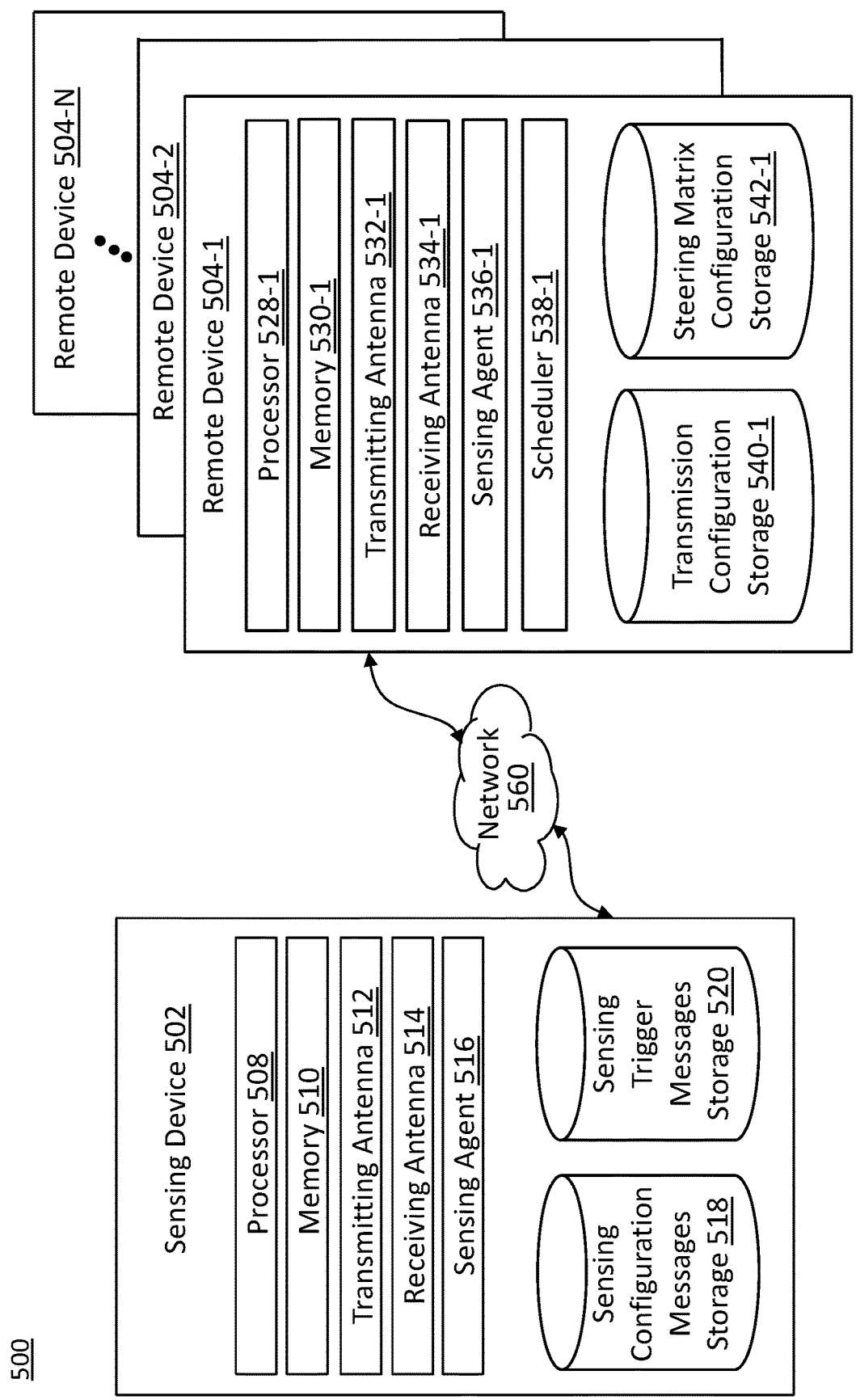
FIG. 5 depicts an implementation of some of an architecture of a system for Wi-Fi sensing, according to some embodiments.

FIG. 5 depicts an implementation of some of an architecture of an implementation of system 500 for Wi-Fi sensing, according to some embodiments.

System 500 (alternatively referred to as Wi-Fi sensing system 500) may include sensing device 502, plurality of remote devices 504-(1-N), and network 560 enabling communication between the system components for information exchange. System 500 may be an example or instance of wireless communication system 100 and network 560 may be an example or instance of wireless network or cellular network, details of which are provided with reference to FIG. 1 and its accompanying description.

According to some embodiments, sensing device 502 may be configured to receive a sensing transmission and perform one or more measurements (for example, CSI) useful for Wi-Fi sensing. These measurements may be known as sensing measurements. In an embodiment, sensing device 502 may be an Access Point (AP). In some embodiments, sensing device 502 may be a Station (STA), for example, in a mesh network scenario. According to an implementation, sensing device 502 may be implemented by a device, such as wireless communication device 102 shown in FIG. 1. In some implementations, sensing device 502 may be implemented by a device, such as wireless communication device 204 shown in FIG. 2A and FIG. 2B. Sensing device 502 may be implemented by a device, such as wireless communication device 402 shown in FIG. 4A and FIG. 4B. In an implementation, sensing device 502 may coordinate and control communication among plurality of remote devices 504-(1-N). According to an implementation, sensing device 502 may be enabled to control a measurement campaign to ensure that required sensing transmissions are made at a required time and to ensure an accurate determination of sensing measurement. In some embodiments, sensing device 502 may process sensing measurements. The sensing measurements may be processed to achieve a sensing goal of system 500.

Referring again to FIG. 5, in some embodiments, remote device 504-1 may be configured to send a sensing transmission to sensing device 502 based on which, one or more sensing measurements (for example, CSI) may be performed for Wi-Fi sensing. In an embodiment, remote device 504-1 may be an STA. In some embodiments, remote device 504-1 may be an AP for Wi-Fi sensing, for example, in scenarios where sensing device 502 acts as STA. According to an implementation, remote device 504-1 may be implemented by a device, such as wireless communication device 102 shown in FIG. 1. In some implementations, remote device 504-1 may be implemented by a device, such as wireless communication device 204 shown in FIG. 2A and FIG. 2B. Further, remote device 504-1 may be implemented by a device, such as wireless communication device 402 shown in FIG. 4A and FIG. 4B. In some implementations, communication between sensing device 502 and remote device 504-1 may be controlled via Station Management Entity (SME) and MAC Layer Management Entity (MLME) protocols. According to an embodiment, each of plurality of remote device 504-(1-N) may be configured to send a sensing transmission to sensing device 502.

Referring to FIG. 5, in more detail, sensing device 502 may include processor 508 and memory 510. For example, processor 508 and memory 510 of sensing device 502 may be processor 114 and memory 116, respectively, as shown in FIG. 1. In an embodiment, sensing device 502 may further include transmitting antenna(s) 512, receiving antenna(s) 514, and sensing agent 516. In some embodiments, an antenna may be used to both transmit and receive signals in a half-duplex format. When the antenna is transmitting, it may be referred to as transmitting antenna 512, and when the antenna is receiving, it may be referred to as receiving antenna 514. It is understood by a person of normal skill in the art that the same antenna may be transmitting antenna 512 in some instances and receiving antenna 514 in other instances. In the case of an antenna array, one or more antenna elements may be used to transmit or receive a signal, for example, in a beamforming environment. In some examples, a group of antenna elements used to transmit a composite signal may be referred to as transmitting antenna 512, and a group of antenna elements used to receive a composite signal may be referred to as receiving antenna 514. In some examples, each antenna is equipped with its own transmission and receive paths, which may be alternately switched to connect to the antenna depending on whether the antenna is operating as transmitting antenna 512 or receiving antenna 514.

In an implementation sensing agent 516 may be responsible for receiving sensing transmissions and associated transmission parameters, calculating sensing measurements, and processing sensing measurements for the purpose of Wi-Fi sensing. In some implementations, receiving sensing transmissions and associated transmission parameters, and calculating sensing measurements may be carried out by an algorithm running in the Medium Access Control (MAC) layer of sensing device 502 and processing sensing measurements for the purpose of Wi-Fi sensing may be carried out by an algorithm running in the application layer of sensing device 502. In examples, the algorithm running in the application layer of sensing device 502 is known as Wi-Fi sensing agent, sensing application or sensing algorithm. In some implementations, the algorithm running in the MAC layer of sensing device 502 and the algorithm running in the application layer of sensing device 502 may run separately on a processor 508. In an implementation, sensing agent 516 may pass physical layer parameters (e.g., such as CSI) from the MAC layer of sensing device 502 to the application layer of sensing device 502. In an example, the application layer may operate on the physical layer parameters and form services or features, which may be presented to an end-user. According to an implementation, communication between the MAC layer of sensing device 502 and other layers or components may take place based on communication interfaces, such as MLME interface and a data interface. According to some implementations, sensing agent 516 may include/execute a sensing algorithm. In an implementation, sensing agent 516 may process and analyze sensing measurements using the sensing algorithm. In an example, sensing agent 516 may be configured to determine a number and timing of sensing transmissions and sensing measurements for the purpose of Wi-Fi sensing.

In an implementation, sensing agent 516 may be configured to cause at least one transmitting antenna of transmitting antenna(s) 512 to transmit messages to remote device 504-1. In an example, sensing agent 516 may be configured to receive, via at least one receiving antenna of receiving antennas(s) 514, messages from remote device 504-1. In an example, sensing agent 516 may be configured to make sensing measurements based on sensing transmissions received from remote device 504-1.

In some embodiments, sensing device 502 may include sensing configuration messages storage 518 and sensing trigger messages storage 520. Sensing configuration messages storage 518 may store sensing configuration messages transmitted by sensing device 502 to remote device 504-1. Sensing trigger messages storage 520 may store sensing trigger messages transmitted by sensing device 502 to remote device 504-1. Information related to the sensing configuration messages stored in sensing configuration messages storage 518 and information related to the sensing trigger messages stored in sensing trigger messages storage 520 may be periodically or dynamically updated as required. In an implementation, sensing configuration messages storage 518 and sensing trigger messages storage 520 may include any type or form of storage, such as a database or a file system or coupled to memory 510.

Referring again to FIG. 5, remote device 504-1 may include processor 528-1 and memory 530-1. For example, processor 528-1 and memory 530-1 of remote device 504-1 may be processor 114 and memory 116, respectively, as shown in FIG. 1. In an embodiment, remote device 504-1 may further include transmitting antenna(s) 532-1, receiving antenna(s) 534-1, sensing agent 536-1, and scheduler 538-1. In an implementation, sensing agent 536-1 may be a block that passes physical layer parameters to or from the MAC of remote device 504-1 to application layer programs. Sensing agent 536-1 may be configured to cause at least one transmitting antenna of transmitting antenna(s) 532-1 and at least one receiving antenna of receiving antennas(s) 534-1 to exchange messages with sensing device 502. In some embodiments, an antenna may be used to both transmit and receive in a half-duplex format. When the antenna is transmitting, it may be referred to as transmitting antenna 532-1, and when the antenna is receiving, it may be referred to as receiving antenna 534-1. It is understood by a person of normal skill in the art that the same antenna may be transmitting antenna 532-1 in some instances and receiving antenna 534-1 in other instances. In the case of an antenna array, one or more antenna elements may be used to transmit or receive a signal, for example, in a beamforming environment. In some examples, a group of antenna elements used to transmit a composite signal may be referred to as transmitting antenna 532-1, and a group of antenna elements used to receive a composite signal may be referred to as receiving antenna 534-1. In some examples, each antenna is equipped with its own transmission and receive paths, which may be alternately switched to connect to the antenna depending on whether the antenna is operating as transmitting antenna 532-1 or receiving antenna 534-1.

In an implementation, scheduler 538-1 may be coupled to processor 528-1 and memory 530-1. In some embodiments, scheduler 538-1 amongst other units may include routines, programs, objects, components, data structures, etc., which may perform particular tasks or implement particular abstract data types. Scheduler 538-1 may also be implemented as, signal processor(s), state machine(s), logic circuitries, and/or any other device or component that manipulates signals based on operational instructions.

In some embodiments, scheduler 538-1 may be implemented in hardware, instructions executed by a processing unit, or by a combination thereof. The processing unit may comprise a computer, a processor, a state machine, a logic array, or any other suitable devices capable of processing instructions. The processing unit may be a general-purpose processor that executes instructions to cause the general-purpose processor to perform the required tasks or, the processing unit may be dedicated to performing the required functions. In some embodiments, scheduler 538-1 may be machine-readable instructions that, when executed by a processor/processing unit, perform any of desired functionalities. The machine-readable instructions may be stored on an electronic memory device, hard disk, optical disk, or other machine-readable storage medium or non-transitory medium. In an implementation, the machine-readable instructions may also be downloaded to the storage medium via a network connection. In an example, machine-readable instructions may be stored in memory 530-1. In an implementation, scheduler 538-1 may be configured to determine when and how the messages are to be exchanged with sensing device 502.

In some embodiments, remote device 504-1 may include transmission configuration storage 540-1 and steering matrix configuration storage 542-1. Transmission configuration storage 540-1 may store requested transmission configuration delivered by sensing device 502 to remote device 504-1 or delivered transmission configuration delivered by remote device 504-1 to sensing device 502. Steering matrix configuration storage 542-1 may store one or more predefined steering matrix configurations. Information regarding transmission configuration stored in transmission configuration storage 540-1 and information regarding the one or more predefined steering matrix configurations stored in steering matrix configuration storage 542-1 may be periodically or dynamically updated as required. In an implementation, transmission configuration storage 540-1 and steering matrix configuration storage 542-1 may include any type or form of storage, such as a database or a file system or coupled to memory 530-1.

According to one or more implementations, communications in network 560 may be governed by one or more of the 802.11 family of standards developed by IEEE. Some example IEEE standards may include IEEE P802.11-REVmd/D5.0, IEEE P802.11ax/D7.0, and IEEE P802.11be/D0.1. In some implementations, communications may be governed by other standards (other or additional IEEE standards or other types of standards). In some embodiments, parts of network 560 which are not required by system 500 to be governed by one or more of the 802.11 family of standards may be implemented by an instance of any type of network, including wireless network or cellular network.

According to one or more implementations, for the purpose of Wi-Fi sensing, sensing device 502 may initiate a measurement campaign. In the measurement campaign, exchange of transmissions between sensing device 502 and remote device 504-1 may occur. In an example, control of these transmissions may be with the MAC (Medium Access Control) layer of the IEEE 802.11 stack. In one implementation, remote device 504-1 may be unknown to sensing device 502. Accordingly, sensing device 502 may query remote device 504-1 for transmission capability regarding transmission parameters that remote device 504-1 can support for the measurement campaign. In another example, sensing device 502 may query remote device 504-1 for transmission capability regarding transmission parameters that remote device 504-1 can support for the measurement campaign without providing any pre-configuration information.

According to an implementation, following authentication and association of remote device 504-1 with network 560, sensing agent 516 may discover remote device 504-1 and transmission (or sensing) capability of remote device 504-1. In an implementation, sensing agent 516 may transmit a message to remote device 504-1 via transmitting antenna 512 to query the transmission capability of remote device 504-1. In an example, sensing agent 516 may query the transmission capability of remote device 504-1 by transmitting a sensing configuration message to remote device 504-1 via transmitting antenna 512.

In an implementation, the sensing configuration message may include data elements. In an example, the sensing configuration message may include a configuration query indication. The configuration query indication may be indicative of a request or query for transmission capability of remote device 504-1. In some examples, the sensing configuration message may include a requested transmission configuration corresponding to the requirements of the measurement campaign (or a sensing transmission). For example, the sensing configuration message may include a requested transmission configuration corresponding to a plurality of requested transmission parameters requested in the sensing transmission and a plurality of fields indicating that respective ones of the plurality of requested transmission parameters may be adjusted. A field from amongst the plurality of fields may indicate a type or degree of permitted adjustment. In an example, a field associated with a transmission parameter may indicate that remote device 504-1 may make any adjustment to the transmission parameter that may be required. For example, the field may provide an indication to what degree of adjustment remote device 504-1 may make to the transmission parameter. The plurality of fields may indicate which requested transmission parameters from amongst the plurality of requested transmission parameters may be varied or adjusted by remote device 504-1 while determining various ways to aggregate a sensing transmission with an existing queued non-sensing message. In an implementation, sensing agent 516 may store the sensing configuration message transmitted to remote device 504-1 in sensing configuration messages storage 518.

According to an implementation, sensing agent 536-1 may receive the sensing configuration message from sensing device 502 via receiving antenna 534-1. In an implementation, in response to receiving the sensing configuration message including the configuration query indication, sensing agent 536-1 may analyze the configuration query indication and create a sensing configuration response message. The sensing configuration response message may include a delivered transmission configuration. In an example, the delivered transmission configuration may include a transmission capability indication associated with remote device 504-1. The transmission capability indication may include a flexibility indication that remote device 504-1 supports flexibility. In an example, the flexibility indication may indicate that the flexibility is supported in timing of sensing transmissions. For example, sensing agent 536-1 may report that scheduler 538-1 supports the flexibility of timing of sensing transmissions. In some examples, the flexibility indication may indicate that the flexibility is supported in one or more transmission parameters. Examples of the one or more transmission parameters include a sensing frequency band parameter, a sensing bandwidth parameter, a sensing channel parameter, a sensing training field parameter, an index into a table of steering matrix configurations, and a steering matrix configuration. The transmission parameters details are provided in Table 1, Table 5 and other referenced tables.

TABLE 1

Transmission Parameters Details

| Name | Type | Valid Range | Description |
|---|---|---|---|
| SensingFrequencyBand | A set of frequency band values or identifiers | As defined in Error! Reference source not found.able 2 (SensingFrequency Band details) | Specifies the band in which sensing device is to take the sensing measurement |
| SensingBandwidth | A set of bandwidth values or identifiers | As defined in Table 3 (SensingBandwidth details) | Specifies the bandwidth in which sensing device is to take the sensing measurement. Note that this is included to allow a bandwidth to be specified if the channel identifier is not sufficient on its own (e.g., the 2.4 GHz band). If the channel identifier also defines the bandwidth, then this may be set to 0 |

TABLE 1-continued

Transmission Parameters Details

| Name | Type | Valid Range | Description |
|---|---|---|---|
| SensingChannel | Integer | 0 . . . 511 | Channel identifier A value of 0 may mean that remote device determines the channel in which to respond based on other parameters and allowable flexibility defined within a message sent from sensing device to remote device to trigger one or more sensing transmissions that may be used for sensing measurements (for example, a sensing trigger message) |
| SensingTrainingField | A set of training field values | As defined in Error! Reference source not found.Table 4 (SensingTraining Field details) | Identifies the training field which is to be used for the sensing measurement |
| SensingSpatialConf-Index | Integer | 0 . . . 15 | Index into a table of steering matrix configurations, such as may be pre-configured for remote device via a sensing configuration message and optionally acknowledged by a sensing configuration response message. 0 may be reserved to indicate no configuration requirement (e.g., remote device may use a default steering matrix configuration) and 15 may be reserved to indicate for remote device to apply the steering matrix configuration specified by the SensingSpatialConf-Index. |
| SensingSpatialConf-SteeringMatrix | A set of spatial steering vector values, for example a phase and gain value, or a real (I) and imaginary (Q) value, each representing a steering matrix configuration | As defined in Table 5 (SensingSpatial-ConfSteeringMatrix details) | A series of steering vectors values (i.e., steering matrix configurations) which are applied to each of the implemented antennas on remote device prior to the sending of a sensing transmission |

TABLE 2

SensingFrequencyBand details

| Value | Meaning |
|---|---|
| 0 | Reserved |
| 1 | 2.4 GHz |
| 2 | 5 GHz |
| 3 | 6 GHz |
| 4 | 60 GHz |
| 5 | 5 GHz flexible |
| 6 | 6 GHz flexible |
| 7 | 60 GHz flexible |

TABLE 2-continued

SensingFrequencyBand details

| Value | Meaning |
|---|---|
| 8 | Any band flexible |
| 9 ... 15 | Reserved |

In an example, use of one of the values that represents flexibility (5 . . . 8) indicates that any band which is lower in frequency than the selected value may be used. For example, "6 GHz flexible" indicates that the 2.4 GHz or the 5 GHz band may be used if remote device 504-1 determines it to be suitable. Other examples of flexibility parameters not shown here may also be defined. Further, "Any band flexible" indicates that remote device 504-1 may respond with a sensing transmission (for example, a sensing configuration response message) in any band.

TABLE 3

SensingBandwidth details

| Value | Meaning |
|---|---|
| 0 | Defined by channel identifier |
| 1 | 20 MHz |
| 2 | 40 MHz |
| 3 | 80 MHz |
| 4 | 80 + 80 MHz |
| 5 | 160 MHz |
| 6 | 40 MHz flexible |
| 7 | 80 MHz flexible |
| 8 | 80 + 80 MHz flexible |

TABLE 3-continued

SensingBandwidth details

| Value | Meaning |
|---|---|
| 9 | 160 MHz flexible |
| 10 | Any bandwidth flexible |
| 11 ... 15 | Reserved |

In an example, use of one of the values that represents flexibility (6 . . . 10) indicates that any bandwidth which is smaller than the selected value may be used. For example, "80 MHz flexible" indicates that the 20 MHz or the 40 MHz bandwidth may be used if remote device 504-1 determines it to be suitable. Other examples of flexibility parameters not shown here may also be defined. Further "Any bandwidth flexible" indicates that remote device 504-1 may respond with a sensing transmission (for example, a sensing configuration response message) in any bandwidth.

TABLE 4

SensingTrainingField details

| Value | Meaning |
|---|---|
| 0 | Reserved |
| 1 | L-LTF |
| 2 | HT-LTF |
| 3 | VHT-LTF |
| 4 | HE-LTF |
| 5 ... 15 | Reserved |

TABLE 5

SensingSpatialConfSteeringMatrix details

| Name | Type | Valid Range | Description |
|---|---|---|---|
| TransmissionAntennaCount | Integer | 1 ... 8 | Number of transmission antennas on remote device used for sensing transmissions. Defines the number of Sensing AntennaNSteeringVectorRe and Sensing AntennaNSteeringVectorIm pairs that follow in the element. At least one antenna must be specified |
| MinimumTransmissionAntennaCount | Integer | 0 ... 8 | Minimum number of transmission antennas on remote device used for sensing transmissions. This parameter allows flexibility in the transmission of the sensing transmission from remote device, for example, in case antennas are already committed for MIMO transmissions. (If TransmissionAntennaCount and MinimumTransmissionAntennaCount are equal then no flexibility is allowed) This parameter is N/A in a sensing response message or a sensing response announcement and may be set to 0 |
| Sensing Antenna0-SteeringVectorRe | Half-precision float (16 bits) | | Real part of the steering vector for antenna 0 |

TABLE 5-continued

SensingSpatialConfSteeringMatrix details

| Name | Type | Valid Range | Description |
|---|---|---|---|
| Sensing Antenna0-SteeringVectorIm | Half-precision float (16 bits) | | Imaginary part of the steering vector for antenna 0 |
| . | . | | . |
| . | . | | . |
| . | . | | . |
| Sensing Antenna7-SteeringVectorRe | Half-precision float (16 bits) | | Real part of the steering vector for antenna 7 |
| Sensing Antenna7-SteeringVectorIm | Half-precision float (16 bits) | | Imaginary part of the steering vector for antenna 7 |

In an example, the data provided in Table 1 to Table 5 may be encoded into an element as described by IEEE P802.11 for inclusion in sensing messages between sensing device 502 and remote device 504-1, or vice versa. In a measurement campaign involving multiple remote devices (for example, plurality of remote devices 504-(1-N)), these transmission parameters may be defined for all remote devices 504-(1-N) (i.e., per remote device). In an example, when transmitted from sensing device 502 to remote device 504-1, these transmission parameters may configure a remote device sensing transmission and when transmitted from remote device 504-1 to sensing device 502, then these transmission parameters may report the configuration used by remote device 504-1 for a sensing transmission. In an implementation, sensing agent 536-1 may transmit the sensing configuration response message including the delivered transmission configuration to sensing device 502 via transmitting antenna 532-1. In an example, sensing agent 536-1 may store the delivered transmission configuration in transmission configuration storage 540-1.

According to an implementation, upon initial association of remote device 504-1 with sensing device 502, upon determining the transmission capabilities of remote device 504-1, or at any other time, sensing agent 516 may transmit a sensing configuration message including a plurality of predefined steering matrix configurations and an indication of a preference ranking of each of the plurality of predefined steering matrix configurations. In an example, each one of the plurality of predefined steering matrix configurations may include at least one of a transmission antenna count, a minimum transmission antenna count, and a sensing antenna steering vector.

In an example implementation, sensing agent 516 may pre-configure n steering matrix configurations. Sensing agent 516 may assign a preference ranking to one or more of each of the n steering matrix configurations. In an example, sensing agent 516 may assign a first preference ranking, a second preference ranking, and optionally up to nth preference ranking to the steering matrix configurations. According to an example, the plurality of predefined steering matrix configurations may be identifiable by an index. In an example, sensing agent 516 may store the plurality of predefined steering matrix configurations, for example, as a lookup table and the index may allow remote device 504-1 to access a single chosen predefined steering matrix configuration.

According to some implementations, steering vector configuration element for a lookup table of steering matrix configurations is described in Table 6.

TABLE 6

Steering Matrix Configuration Element details

| Name | Type | Valid Range | Description |
|---|---|---|---|
| LookupEntriesCount | Integer | 1 . . . 14 | Number of entries in the lookup table specified by this Element. Defines the number of EntryM . . . sets of data that follow in the element. At least one entry must be specified. |
| TransmissionAntennaCount | Integer | 1 . . . 8 | Number of transmission antennas on remote device used for sensing transmissions. Defines the number of SensingAntennaNSteeringVectorRe and SensingAntennaNSteeringVectorIm pairs that follow in the element. At least one antenna must be specified. |

TABLE 6-continued

Steering Matrix Configuration Element details

| Name | Type | Valid Range | Description |
| --- | --- | --- | --- |
| Entry 1 SensingAntenna0-SteeringVectorRe | Half-precision float (16 bits) | | Real part of the steering vector for antenna 0 in lookup table entry 1 |
| Entry 1 SensingAntenna0-SteeringVectorIm | Half-precision float (16 bits) | | Imaginary part of the steering vector for antenna 0 in lookup table entry 1 |
| Entry 1 Sensing Antenna7-SteeringVectorRe | Half-precision float (16 bits) | | Real part of the steering vector for antenna 7 in lookup table entry 1 |
| Entry 1 Sensing Antenna7-SteeringVectorIm | Half-precision float (16 bits) | | Imaginary part of the steering vector for antenna 7 in lookup table entry 1 |
| Entry 14 Sensing Antenna0-SteeringVectorRe | Half-precision float (16 bits) | | Real part of the steering vector for antenna 0 in lookup table entry 14 |
| Entry 14 Sensing Antenna0-SteeringVectorIm | Half-precision float (16 bits) | | Imaginary part of the steering vector for antenna 0 in lookup table entry 14 |
| Entry 14 Sensing Antenna7-SteeringVectorRe | Half-precision float (16 bits) | | Real part of the steering vector for antenna 7 in lookup table entry 14 |
| Entry 14 Sensing Antenna7-SteeringVectorIm | Half-precision float (16 bits) | | Imaginary part of the steering vector for antenna 7 in lookup table entry 14 |

In an example, the data provided in Table 6 may be encoded into an element as described by IEEE P802.11 for inclusion in the messages between sensing device 502 and remote device 504-1. In a measurement campaign involving multiple remote devices (for example, plurality of remote devices 504-(1-N)), steering matrix configurations may be defined for all remote devices. When transmitted from sensing device 502 to remote device 504-1 then the steering matrix configurations populate a lookup table (which may be accessed via an index).

According to an implementation, sensing agent 516 may transmit the sensing configuration message including the plurality of predefined steering matrix configurations and the indication of the preference ranking of each of the plurality of predefined steering matrix configurations to remote device 504-1 via transmitting antenna 512. In an example, sensing agent 516 may transmit the sensing configuration message to remote device 504-1 using a broadcast message.

In an implementation, sensing agent 536-1 may receive the sensing configuration message including the plurality of predefined steering matrix configurations from sensing device 502 via receiving antenna 534-1. In an example, sensing agent 536-1 may receive the sensing configuration message as the broadcast message. Sensing agent 536-1 may then decode the sensing configuration message to determine the plurality of predefined steering matrix configurations and the indication of the preference ranking of each of the plurality of predefined steering matrix configurations. In response to receiving the sensing configuration message including the plurality of predefined steering matrix configurations and the indication of the preference ranking of each of the plurality of predefined steering matrix configurations, sensing agent 536-1 may create a sensing configuration response message. The sensing configuration response message may include a selected steering matrix configuration from amongst the plurality of predefined steering matrix configurations. In an example, the selected steering matrix configuration may have a highest preference ranking and may permit aggregation of a sensing transmission with an existing queued non-sensing message. For example, sensing agent 536-1 may select a steering matrix configuration that has been assigned a first preference ranking by sensing device 502. In an implementation, sensing agent 536-1 may send the sensing configuration response message to sensing device 502 via transmitting antenna 532-1. In an implementation, sensing agent 536-1 may store the plurality of predefined steering matrix configurations in steering matrix configuration storage 542-1.

According to one or more implementations, sensing agent 516 may initiate a sensing transmission with a specification of a steering matrix configuration that sensing device 502 requires remote device 504-1 to use. In an implementation, sensing agent 516 may generate a sensing trigger message with the specification of the steering matrix configuration included. In an implementation, the sensing trigger message may include an indication that use of the steering matrix configuration is optional. In some implementations, the sensing trigger message may include an indication that use of a steering matrix configuration provided via a previous sensing configuration message may be required. In some implementations, the sensing trigger message may include an indication that any steering matrix configuration may be used or that a unity steering matrix configuration may be used.

In some implementations, sensing agent 516 may generate a sensing trigger message including a requested transmission configuration that sensing device 502 requires remote device 504-1 to use. In examples the requested transmission configuration within the sensing trigger message overrides a configuration that has been made previously by sensing device 502 and acknowledged by remote device 504-1 and may change any parameters within the requested transmission configuration and any flexibility indication associated with the any parameters. In an example, the requested transmission configuration provided by sensing device 502 in the sensing trigger message may allow greater flexibility to remote device 504-1 to vary transmission parameters for a sensing transmission and may improve the opportunity that remote device 504-1 has to aggregate the sensing transmission with a non-sensing message.

In some implementations, sensing agent 516 may generate a sensing trigger message including requested timing configuration. The requested timing configuration may be indicative of timing requirements for the measurement campaign including a series of sensing transmissions from remote device 504-1 to sensing device 502. In an example, sensing agent 516 may initiate a periodic series of sensing transmissions via the sensing trigger message. Accordingly, a single sensing trigger message may trigger more than one sensing transmissions by remote device 504-1. In some examples, sensing agent 516 may initiate a semi-periodic series of sensing transmissions via the sensing trigger message. The requested timing configuration may include at least one of a sensing measurement type, a time between sensing transmissions, a time flexibility window, and a number of sensing transmissions of a measurement campaign.

Examples of parameters defined as a part of a measurement campaign for periodic or semi-periodic sensing transmissions, for example, from remote device 504-1 to sensing device 502 are provided in Table 7.

TABLE 8

SensingMeasType details

| Value | Meaning |
|---|---|
| 0 | Reserved |
| 1 | Single |
| 2 | Multi |
| 3 | Periodic |
| 4 | None |
| 5 . . . 15 | Reserved |

In an example, the parameters defined in Tables 7 and 8 are encoded into an element as described by IEEE P802.11 for inclusion in the sensing messages between sensing device 502 and remote device 504-1. According to an implementation, for a measurement campaign involving multiple remote devices (for example, plurality of remote devices 504-(1-N), these parameters may be defined for all remote devices.

In some examples, a time-of-first sensing transmission may be specified in a timing configuration element. An example of a suitable, common time reference is the TSF. In examples, a value for TSF representing a time in the future may be specified as part of the requested timing configuration, and the first sensing transmission made by remote device 504-1 is delivered by scheduler 538-1 at the specified time. In an example, resolution of the TSF may be reduced to reduce the number of bits of data that must be transferred to specify the time-of-first sensing transmission.

In an implementation, the requested timing configuration may include a flexibility indication that the requested timing configuration is flexible. In an example, the flexibility indication may indicate a degree of adjustments permitted to the requested timing configuration. In some examples, the flexibility indication may indicate an extended window of time with respect to a specific time within which a sensing transmission may be transmitted. In an implementation, sensing agent 516 may transmit the sensing trigger message including the requested timing configuration to remote device 504-1 via transmitting antenna 512.

TABLE 7

Timing Configuration Elements

| Name | Type | Valid Range | Description |
|---|---|---|---|
| SensingMeasType | A set of sensing measurement type values | As defined in TABLE 8 (SensingMeasType details) | Specifies the band in which sensing device is to take the sensing measurement |
| TimeBetweenFrames | Integer | 0 . . . 255 | Specifies the time between sensing transmissions from remote device to sensing device in units of 100 ms. Ignored in the case of single sensing transmission |
| TimeFlexibilityWindow | Integer | 0 . . . 255 | Specifies the window of a time of sensing transmission in units of 10 us which may be acceptable to sensing device (0 means no flexibility is allowed) |
| NumberSensingMeas | Integer | 0 . . . 65535 | Number of sensing transmissions made in a multi-transmission measurement campaign. Ignored in case of a single sensing transmission |

According to one or more implementations, sensing agent 536-1 may receive the sensing trigger message including the requested transmission configuration corresponding to the plurality of requested transmission parameters from sensing device 502 via receiving antenna 534-1. According to one or more implementations, sensing agent 536-1 may generate a sensing response message as a sensing transmission in response to the sensing trigger message. In an example, the sensing response message may include a delivered transmission configuration. In an example, the delivered transmission configuration may indicate a plurality of applied transmission parameters. For example, the delivered transmission configuration may describe the transmission parameters that have been delivered by the application of transmission parameters that are flexible. In some examples, the delivered transmission configuration may indicate adjustments that have been made to the plurality of requested transmission parameters. The delivered transmission configuration may also describe a method by which the plurality of requested transmission parameters may have been adjusted. In examples, sensing agent 536-1 may determine the delivered transmission parameters that allows remote device 504-1 to aggregate the sensing response message with an existing non-sensing message.

According to one or more implementations, sensing agent 536-1 may receive the sensing trigger message including the requested timing configuration from sensing device 502 via receiving antenna 534-1. In response to receiving the sensing trigger message, sensing agent 536-1 may generate one or more sensing transmissions.

In some implementations, when a sensing transmission from remote device 504-1 is required, for example in response to receiving a sensing trigger message from sensing device 502, scheduler 538-1 may determine whether there is a non-sensing message queued to be transmitted to sensing device 502 that is scheduled to be transmitted at the requested time of the sensing transmission. On determining that there is a queued non-sensing message, scheduler 538-1 may incorporate the sensing transmission into the queued non-sensing message creating an aggregated message. In an implementation, sensing agent 536-1 may transmit the sensing transmission to sensing device 502 via transmitting antenna 532-1. In an implementation sensing agent 536-1 may transmit the sensing transmission to sensing device 502 using the highest ranked steering matrix configuration from the plurality of predefined steering matrix configurations in steering matrix configuration storage 542-1 which allows scheduler 538-1 to incorporate the sensing transmission into the queued non-sensing message creating an aggregated message. According to an implementation, since the sensing transmission is aggregated with the queued non-sensing message, dedicated sensing response messages and sensing response announcements that remote device 504-1 may be required to generate is significantly reduced.

In an implementation, sensing agent 516 may receive the sensing transmission from remote device 504-1 via receiving antenna 514. In response to receiving the sensing transmission, sensing agent 516 may apply a time stamp to the sensing transmission.

In an implementation, sensing device 502 and remote device 504-1 may form a part of a BSS. According to an IEEE 802.11 standard, a TSF Timer (also referred to as a system clock) of each individual device within the BSS is synchronized to within a predefined tolerance value using the TSF along with synchronizing beacon frames. In an example, the predefined tolerance value is ±100 ppm. In an implementation, a value of the TSF Timer of sensing device 502 and remote device 504-1 may be identical to within the predefined tolerance value of the TSF. According to an example, the value of the TSF Timer may be associated with a reference time in real-time, such as Coordinated Universal Time (UTC), Global Positioning System (GPS) time, or a network time derived from a Network Time Protocol (NTP) server.

In an implementation, sensing agent 516 may generate a time stamp to be associated with the sensing transmission. In an example, sensing agent 516 may generate the time stamp according to a timing indication indicating when the sensing transmission was valid from the time value of the TSF Timer, i.e., as determined during identification of the timing indication. Other examples of generation of the time stamp that are not discussed are contemplated herein. Sensing agent 516 may then apply the time stamp to the sensing transmission. According to an implementation, system 500 may be enabled to compensate/remove measurement time jitter and the application of the time stamp to the sensing transmission may allow much greater flexibility of variation of the time of sensing transmission.

Figure 6:
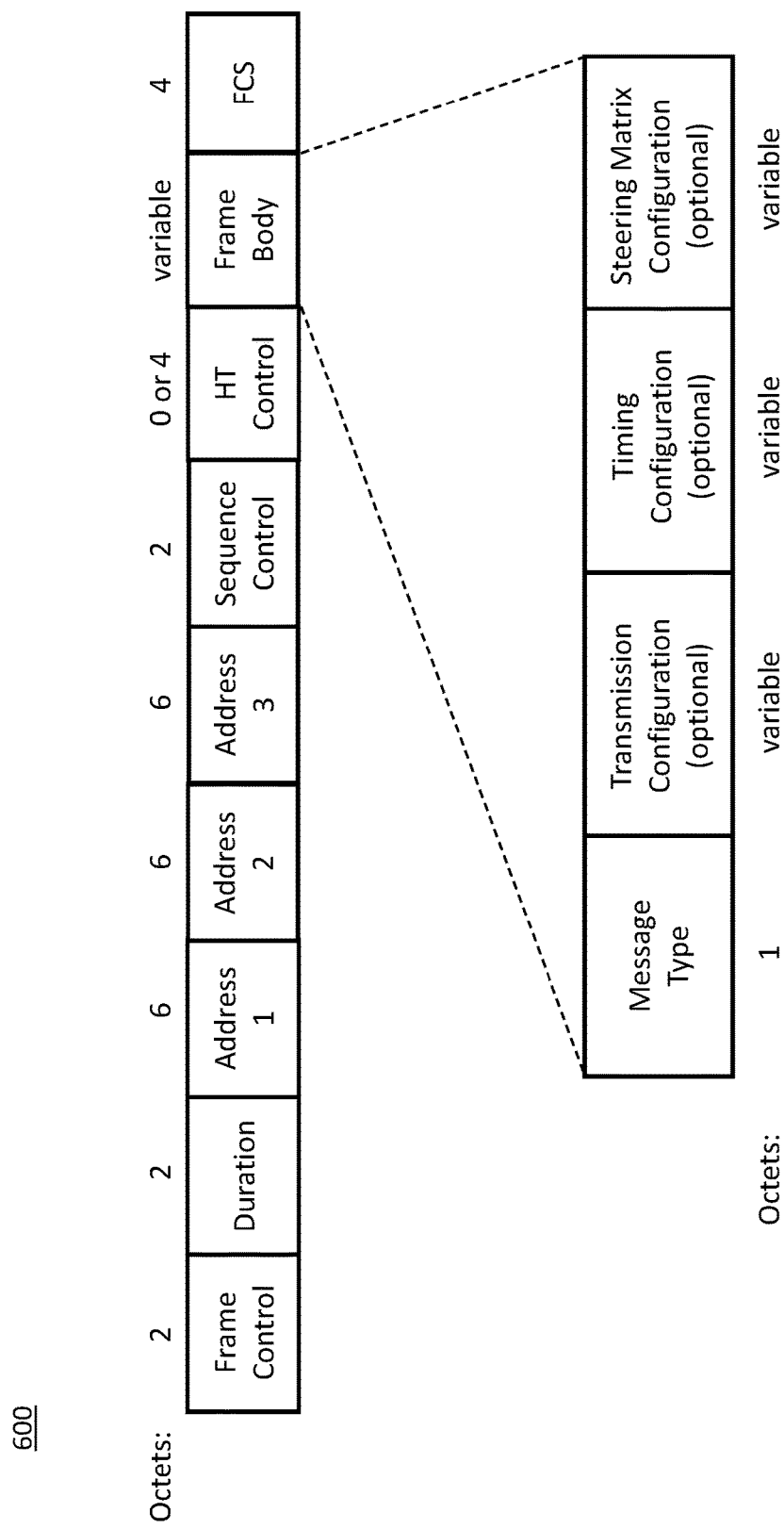
FIG. 6 illustrates a management frame carrying a message, according to some embodiments.

As described above, some embodiments of the present disclosure define four sensing message types for Wi-Fi sensing, namely, sensing configuration message, sensing configuration response message, sensing trigger message, and sensing response message. In an example, all message types are carried in a new extension to a management frame 600 of a type described in IEEE 802.11. FIG. 6 illustrates management frame 600 carrying a message. In an example, system 500 may run with acknowledgement frames and the management frame carrying sensing messages is implemented as an Action frame and in another example, system 500 may run without acknowledgement frames and the management frame carrying sensing messages is implemented as an Action No Ack frame. In some examples, all message types are carried in a new extension to an IEEE 802.11 control frame. In some examples, a combination of management and control frames may be used to realize these sensing message types.

In some examples, Transmission Configuration in the form of requested transmission configuration and delivered transmission configuration, Timing Configuration in the form of requested timing configuration, and Steering Matrix Configuration as described in FIG. 6 are implemented as IEEE 802.11 elements. In one or more embodiments, the sensing message types may be identified by the message type field and each sensing message type may or may not carry the other identified elements, according to some embodiments. Examples of sensing message types and configuration elements are provided in Table 9. In an example, the one or more configuration elements contained in management frame 600 may be referred to as a sensing measurement parameter element.

TABLE 9

Sensing message types and configuration elements

| Value | Message Type | Message Direction | Transmission Configuration | Timing Configuration | Steering Matrix Configuration |
|---|---|---|---|---|---|
| 0 | Sensing configuration message | Sensing device to remote device | Optional Option 1: Specifies requested transmission configuration to be used by remote device for the measurement campaign or for a single sensing transmission in the case where a requested transmission configuration is not provided in a sensing trigger message. Option 2: If this element is absent in sensing configuration message, then remote device may treat this message as a remote device transmission capability query. | N/A | Optional Option 1: Specifies a set of steering matrix configurations that make up a lookup table and can be requested for a sensing transmission via an index in a sensing trigger message. Option 2: Specifies a default steering matrix configuration to use if none is specified in a sensing trigger message. If this field is absent, then remote device treats this message as a remote device transmission capability query. |
| 1 | Sensing configuration response message | Remote device to sensing device | Option 1: If this element is absent in the sensing configuration message, remote device replies with delivered transmission configuration (transmission parameters that are supported by remote device). Option 2: If this element is present in the sensing configuration message, remote device sends the delivered transmission configuration (transmission parameters which are supported) and configures itself according to the delivered transmission configuration. | N/A | If this element is absent in the sensing configuration message, remote device may respond with its antenna configuration (e.g., number of transmit/receive chains, number of antennas, digital/analog beamforming capabilities, etc.) |

TABLE 9-continued

Sensing message types and configuration elements

| Value | Message Type | Message Direction | Transmission Configuration | Timing Configuration | Steering Matrix Configuration |
|---|---|---|---|---|---|
| 2 | Sensing trigger message | Sensing device to remote device | Optional Option 1: If this element is absent then remote device may use pre-configured required transmission configuration values from the sensing configuration message. Option 2: If this element is present in the sensing trigger message, remote device applies the required transmission configuration from this element. | Optional Option 1: If this configuration is absent, then the sensing trigger message initiates a single sensing transmission. Option 2: If this element is present then it specifies the periodicity of a measurement campaign and this sensing trigger message initiates the first sensing transmission of the measurement campaign. | Optional Option 1: If this element is absent, then remote device transmits the one or more sensing transmissions specified by the sensing trigger message using the pre-configured default steering matrix configuration. Option 2: If this element is present, the element specifies a steering matrix to use for remote device sensing transmission, or a series of steering matrix configurations to use for sensing transmissions of a measurement campaign. The steering matrix configuration(s) can be specified using indices into a pre-configured steering matrix configuration table, or specific beamforming weights for each transmit path or transmitting antenna of remote device may be specified. |
| 4 | Sensing response message | Remote device to sensing device | Optional Option 1: Transmission parameters of this transmission (delivered transmission configuration) Option 2: A single bit flag if remote device applies the requested transmission configuration. Option 3: If this element is absent then remote device applies the requested transmission parameters | N/A | Optional Option 1: Steering matrix configuration applied to this transmission. Option 2: Index into a pre-configured steering matrix configuration table indicating the steering matrix configuration applied to this transmission. Option 3: If this element is absent then remote device applies the requested steering matrix configuration |

TABLE 9-continued

Sensing message types and configuration elements

| Value | Message Type | Message Direction | Transmission Configuration | Timing Configuration | Steering Matrix Configuration |
|---|---|---|---|---|---|
| | | | Option 4: A bit flag where each bit represents an aspect of the transmission configuration wherein the bit is set to "1" if that aspect of the requested transmission configuration is applied, and "0" if that aspect of the requested transmission configuration is not applied. | | |
| 3 and 5 . . . 255 | Reserved | N/A | N/A | N/A | N/A |

According to aspects of the present disclosure, configuration and triggering of a sensing transmission (i.e., requested transmission configuration included in the sensing trigger message) may be made to allow for defined levels of flexibility in the resulting sensing transmission (i.e., how much variation the delivered transmission configuration of the sensing transmission may have from the requested transmission configuration of the sensing transmission) such that sensing transmissions may be aggregated with data transmissions (i.e., non-sensing messages) more often, resulting in a lower impact of sensing transmissions on the IEEE 802.11 data network. As described above, aspects of the sensing transmission which may be subject to flexibility include band of transmission (SensingFrequencyBand, as described in Table 2), channel bandwidth (SensingBandwidth, as described in Table 3), antenna steering matrix (SensingSpatialConfSteeringMatrix, as described in Table 5), and timing (requested timing configuration, as described in Table 7).

Figure 7:
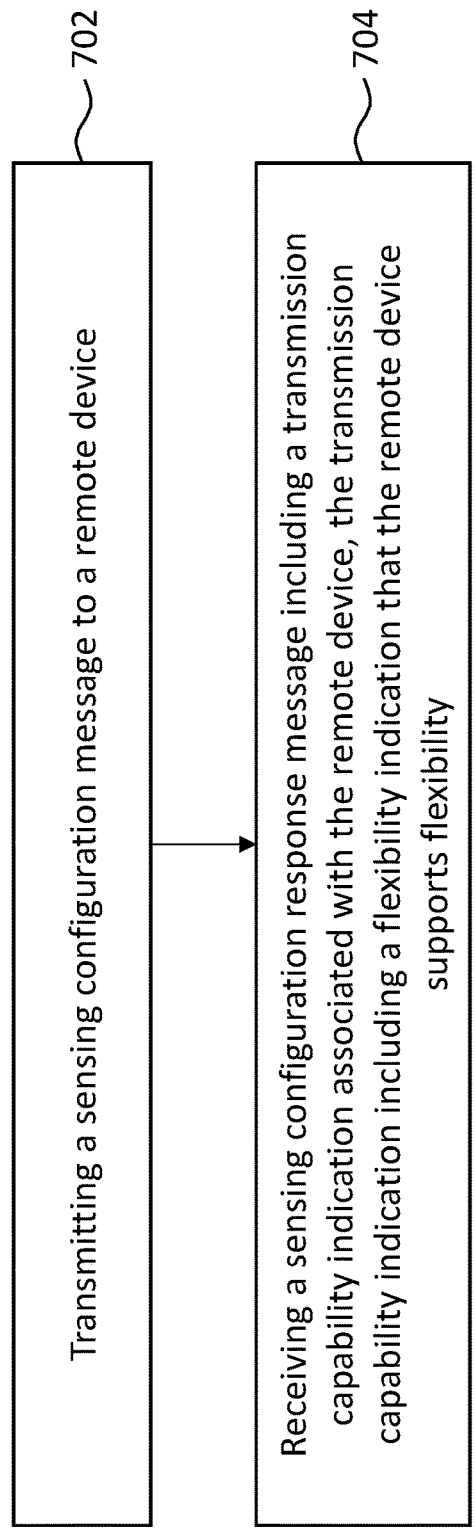
FIG. 7 depicts a flowchart for receiving a sensing configuration response message including a transmission capability indication associated with a remote device, according to some embodiments.

FIG. 7 depicts flowchart 700 for receiving a sensing configuration response message including a transmission capability indication associated with a remote device, according to some embodiments.

In a brief overview of an implementation of flowchart 700, at step 702, a sensing configuration message is transmitted to a remote device. At step 704, a sensing configuration response message including a transmission capability indication associated with the remote device is received from the remote device. The transmission capability indication includes a flexibility indication that the remote device supports flexibility.

Step 702 includes transmitting a sensing configuration message to a remote device. The sensing configuration response message may include a requested transmission configuration. In an implementation, sensing device 502 may transmit the sensing configuration message to remote device 504-1.

Step 704 includes receiving a sensing configuration response message including a transmission capability indication associated with the remote device. The transmission capability indication may include a flexibility indication that the remote device supports flexibility. In an example, the flexibility indication may indicate that the flexibility is supported in one or more transmission parameters. The one or more transmission parameters may include one or more of a sensing frequency band parameter, a sensing bandwidth parameter, a sensing channel parameter, a sensing training field parameter, an index into a table of steering matrix configurations, and a steering matrix configuration. In some examples, the flexibility indication may indicate the flexibility is supported in timing of sensing transmissions. According to an implementation, sensing device 502 may receive the sensing configuration response message including the transmission capability indication associated with remote device 504-1.

Figure 8:
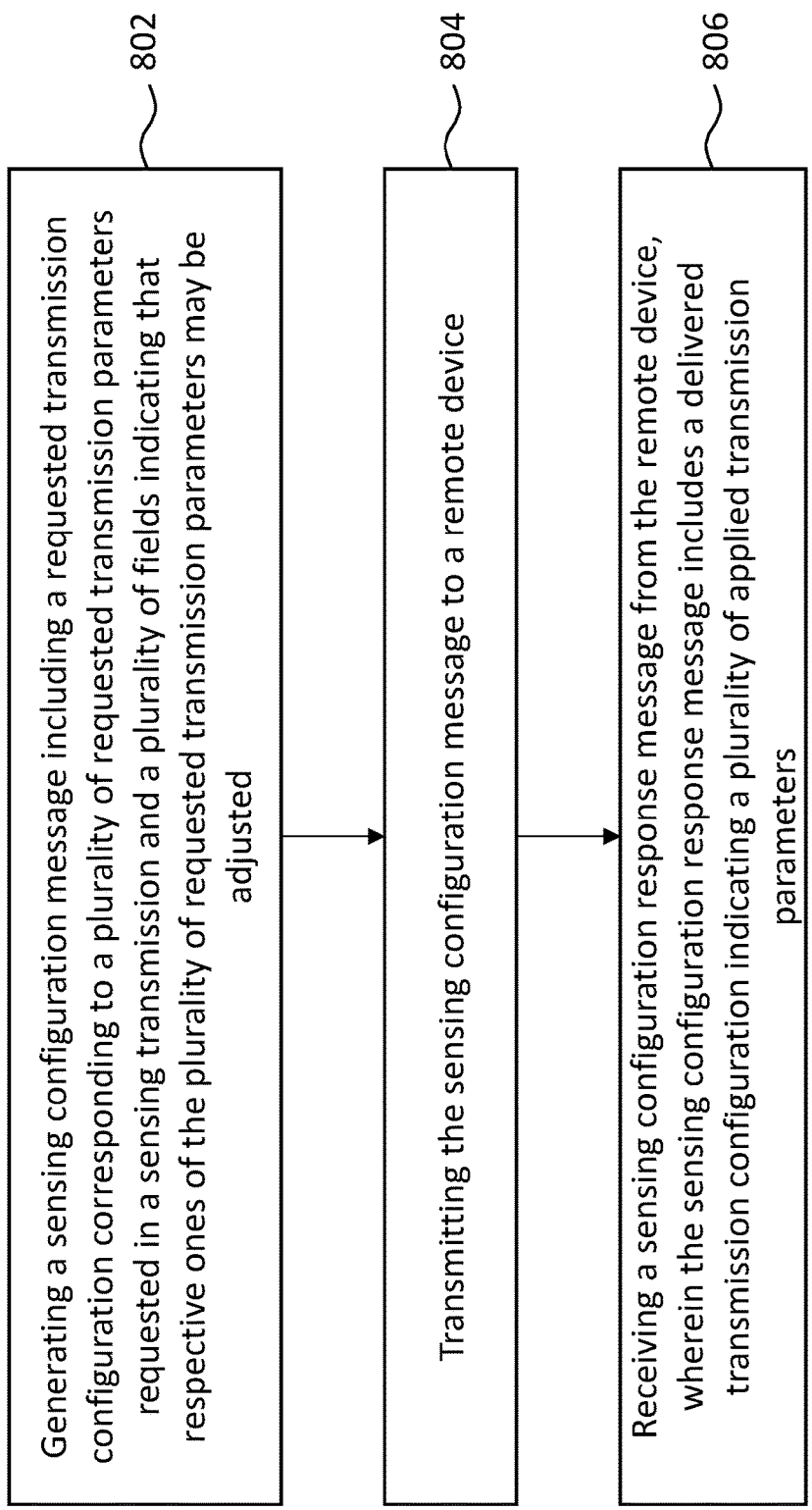
FIG. 8 depicts a flowchart for generating a sensing configuration message including a requested transmission configuration, according to some embodiments.

FIG. 8 depicts flowchart 800 for generating a sensing configuration message including a requested transmission configuration, according to some embodiments.

In a brief overview of an implementation of flowchart 800, at step 802, a sensing configuration message is generated. The sensing configuration message includes a requested transmission configuration and a flexibility indication of the requested transmission configuration. At step 804, the sensing configuration message is transmitted to a remote device. At step 806, a sensing configuration response message is received from the remote device. The sensing configuration response message includes a delivered transmission configuration indicating a plurality of applied transmission parameters.

Step 802 includes generating a sensing configuration message including a requested transmission configuration corresponding to a plurality of requested transmission parameters requested in a sensing transmission and a plurality of fields indicating that respective ones of the plurality of requested transmission parameters may be adjusted. A field from amongst the plurality of fields may indicate a type or degree of permitted adjustment. According to an implementation, sensing device 502 may generate the sensing configuration message.

Step 804 includes transmitting the sensing configuration message to remote a device. According to an implementation, sensing device 502 may transmit the sensing configuration message to remote device 504-1.

Step 806 includes receiving a sensing configuration response message from the remote device. The sensing configuration response message may include a delivered transmission configuration indicating a plurality of applied transmission parameters. In an implementation, sensing device 502 may receive the sensing configuration response message from remote device 504-1.

Figure 9:
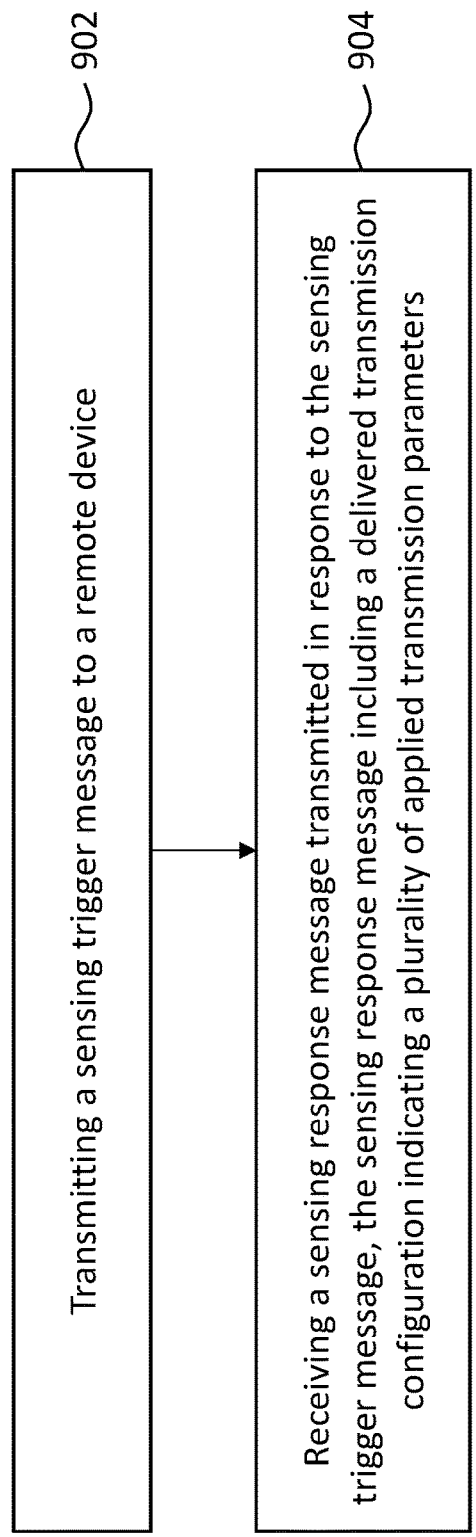
FIG. 9 depicts a flowchart for transmitting a sensing trigger message to the remote device, according to some embodiments.

FIG. 9 depicts flowchart 900 for transmitting a sensing trigger message to a remote device, according to some embodiments.

In a brief overview of an implementation of flowchart 900, at step 902, a sensing trigger message is transmitted to a remote device. At step 904, a sensing response message transmitted in response to the sensing trigger message is received. The sensing response message includes a delivered transmission configuration indicating a plurality of applied transmission parameters.

Step 902 includes transmitting a sensing trigger message to a remote device. In an example, the sensing trigger message may include requested transmission configuration. In an implementation, sensing device 502 may transmit the sensing trigger message to remote device 504-1.

Step 904 includes receiving a sensing response message transmitted in response to the sensing trigger message. In an example, the sensing response message may include a delivered transmission configuration indicating a plurality of applied transmission parameters. According to an implementation, sensing device 502 may receive the sensing response message from remote device 504-1 transmitted in response to the sensing trigger message.

Figure 10:
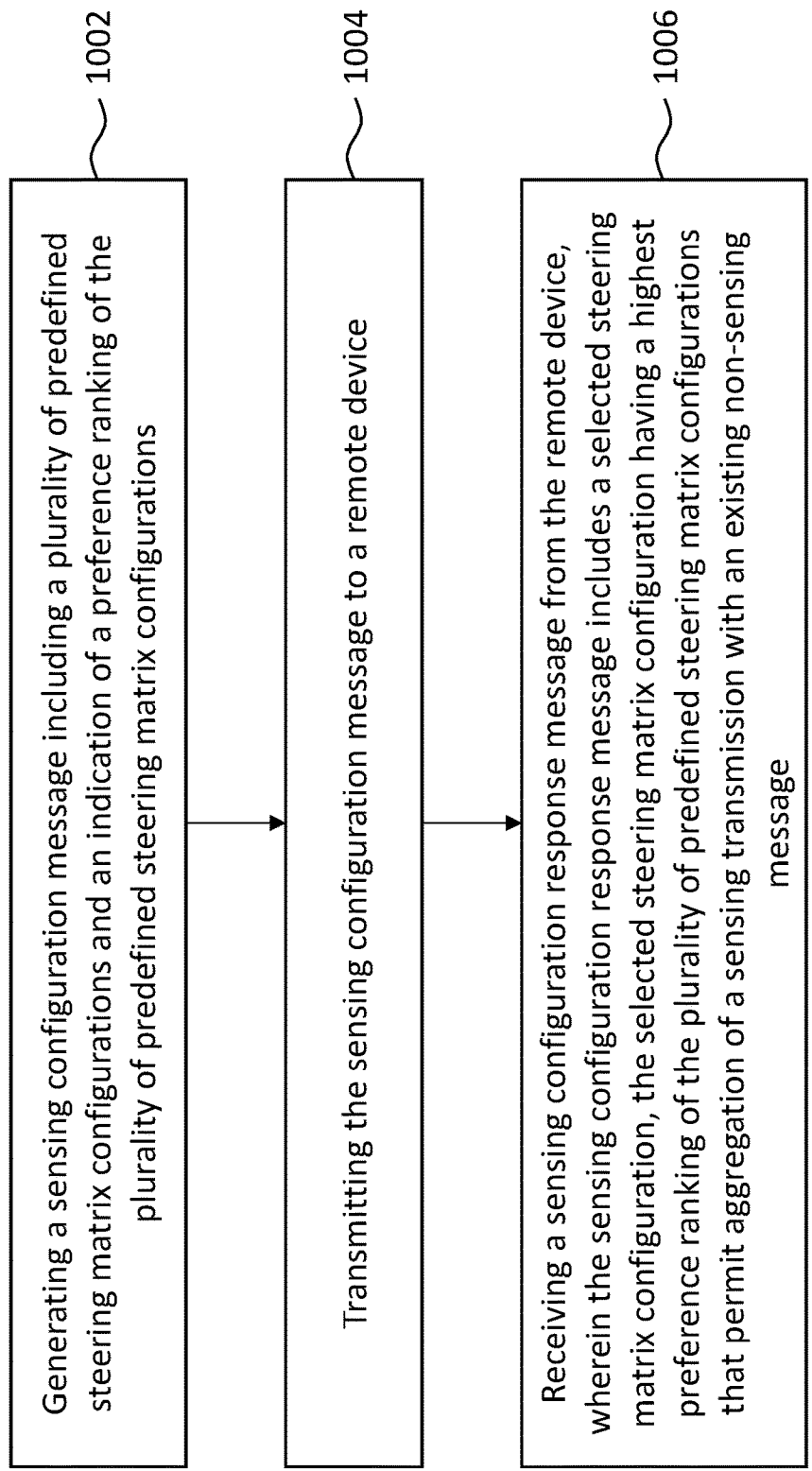
FIG. 10 depicts a flowchart for generating a sensing configuration message including a plurality of predefined steering matrix configurations, according to some embodiments.

FIG. 10 depicts flowchart 1000 for generating a sensing configuration message including a plurality of predefined steering matrix configurations, according to some embodiments.

In brief overview of an implementation of flowchart 1000, at step 1002, a sensing configuration message is generated. The sensing configuration message includes a plurality of predefined steering matrix configurations and an indication of a preference ranking of the plurality of predefined steering matrix configurations. At step 1004, the sensing configuration message is transmitted to a remote device. At step 1006, a sensing configuration response message is received from the remote device. The sensing configuration response message includes a selected steering matrix configuration. The selected steering matrix configuration has a highest preference ranking of the plurality of predefined steering matrix configurations that permit aggregation of a sensing transmission with an existing non-sensing message.

Step 1002 includes generating a sensing configuration message including a plurality of predefined steering matrix configurations and an indication of a preference ranking of the plurality of predefined steering matrix configurations. In an example, each one of the plurality of predefined steering matrix configurations may include at least one of a transmission antenna count, a minimum transmission antenna count, and a sensing antenna steering vector. In an implementation, sensing device 502 may generate the sensing configuration message including the plurality of predefined steering matrix configurations and the indication of the preference ranking of the plurality of predefined steering matrix configurations.

Step 1004 includes transmitting the sensing configuration message to a remote device. In an implementation, sensing device 502 may transmit the sensing configuration message to remote device 504-1. In some implementations, sensing device 502 may transmit a sensing trigger message including an indication that use of the predefined steering matrix configuration is optional to remote device 504-1.

Step 1006 includes receiving a sensing configuration response message from the remote device. The sensing configuration response message may include a selected steering matrix configuration. The selected steering matrix configuration has a highest preference ranking of the plurality of predefined steering matrix configurations that permit aggregation of a sensing transmission with an existing non-sensing message. In some implementations, sensing device 502 may receive the sensing configuration response message from remote device 504-1.

Figure 11:
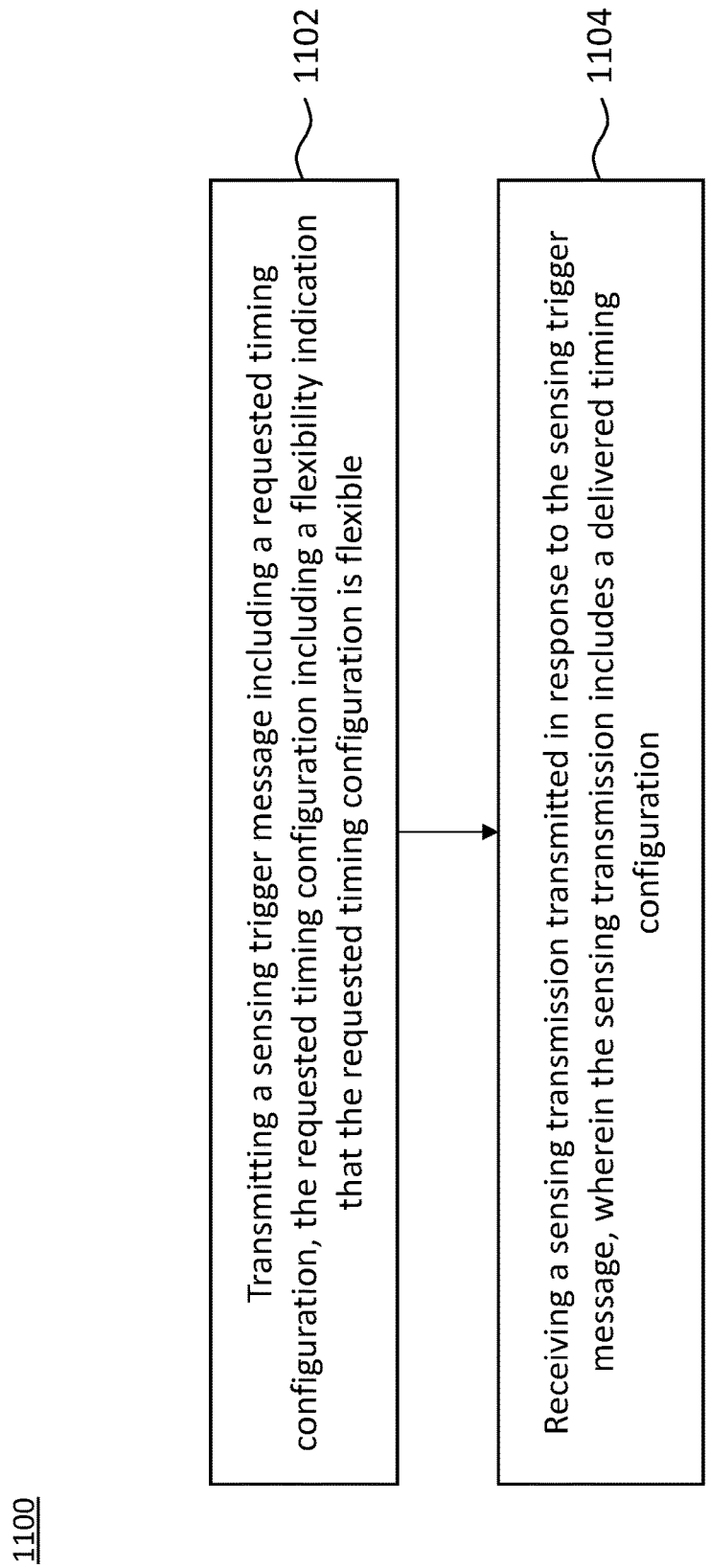
FIG. 11 depicts a flowchart for receiving a sensing transmission including a delivered transmission configuration, according to some embodiments.

FIG. 11 depicts flowchart 1100 for receiving a sensing transmission allowing for a flexible timing configuration, according to some embodiments.

In a brief overview of an implementation of flowchart 1100, at step 1102, a sensing trigger message is transmitted to a remote device. The sensing trigger message includes a requested timing configuration. The requested timing configuration includes a flexibility indication that the requested timing configuration is flexible. At step 1104, a sensing transmission transmitted in response to the sensing trigger message is received. The sensing transmission includes a delivered transmission configuration.

Step 1102 includes transmitting a sensing trigger message including a requested timing configuration. The requested timing configuration may include a flexibility indication that the requested timing configuration is flexible. In an example, the requested timing configuration may be indicative of timing requirements for a measurement campaign including a series of sensing transmissions from a remote device to a sensing device. In an example, the requested timing configuration may include at least one of a sensing measurement type, a time between sensing transmissions, a time flexibility window, and a number of sensing transmissions of a measurement campaign. In an example, the flexibility indication may indicate a degree of adjustments permitted to the requested timing configuration. In some examples, the flexibility indication indicates an extended window of time within which the sensing transmission may be transmitted. According to an implementation, sensing device 502 may transmit the sensing trigger message including the requested timing configuration to remote device 504-1.

Step 1104 includes receiving a sensing transmission transmitted in response to the sensing trigger message. The sensing transmission may include a delivered transmission configuration. According to an implementation, sensing device 502 may receive the sensing transmission from remote device 504-1 transmitted in response to the sensing trigger message.

Figure 12:
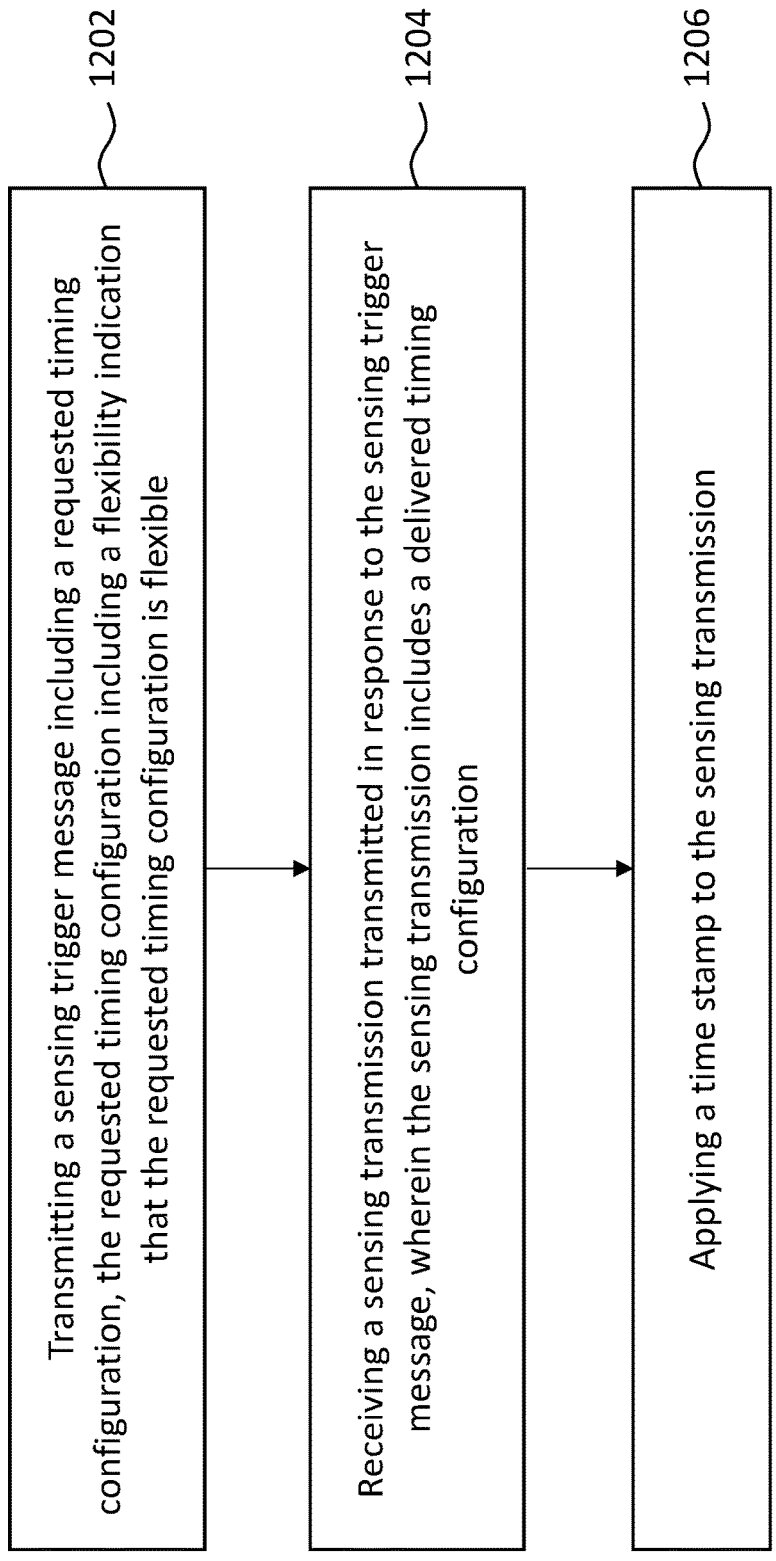
FIG. 12 depicts a flowchart for applying a time stamp to a sensing transmission, according to some embodiments.

FIG. 12 depicts flowchart 1200 for applying a time stamp to a sensing transmission, according to some embodiments.

In brief over of an implementation of flowchart 1200, at step 1202, a sensing trigger message including a requested timing configuration is transmitted. The requested timing configuration includes a flexibility indication that the requested timing configuration is flexible. At step 1204, a sensing transmission transmitted in response to the sensing trigger message is received. The sensing transmission includes a delivered transmission configuration. At step 1206, a time stamp is applied to the sensing transmission.

Step 1202 includes transmitting a sensing trigger message including a requested timing configuration. The requested timing configuration may include a flexibility indication that the requested timing configuration is flexible. In an example, the requested timing configuration may be indicative of timing requirements for a measurement campaign including a series of sensing transmissions from a remote device to a sensing device. In an example, the requested timing configuration may include at least one of a sensing measurement type, a time between sensing transmissions, a time flexibility window, and a number of sensing transmissions of a measurement campaign. In an example, the flexibility indication may indicate a degree of adjustments permitted to the requested timing configuration. In some examples, the flexibility indication indicates an extended window of time within which the sensing transmission may be transmitted. According to an implementation, sensing device 502 may transmit the sensing trigger message including the requested timing configuration to remote device 504-1.

Step 1204 includes receiving a sensing transmission transmitted in response to the sensing trigger message. The sensing transmission may include a delivered transmission configuration. According to an implementation, sensing device 502 may receive the sensing transmission from remote device 504-1 transmitted in response to the sensing trigger message.

Step 1206 includes applying a time stamp to the sensing transmission. According to an implementation, sensing device 502 may apply the time stamp to the sensing transmission.

Additional specific embodiments include:

Embodiment 1 is a system for Wi-Fi sensing, where the system comprises a sensing device having a transmitting antenna, a receiving antenna, and at least one processor configured to execute instructions for transmitting, via the transmitting antenna of the sensing device, a sensing configuration message, and receiving, via the receiving antenna of the sensing device, a sensing configuration response message including a transmission capability indication associated with a remote device, the transmission capability indication including a flexibility indication that the remote device supports flexibility.

Embodiment 2 is the system of embodiment 1, wherein the flexibility indication indicates the flexibility is supported in one or more transmission parameters.

Embodiment 3 is the system of embodiment 2, wherein the one or more transmission parameters include one or more of a sensing frequency band parameter, a sensing bandwidth parameter, a sensing channel parameter, a sensing training field parameter, an index into a table of steering matrix configurations, and a steering matrix configuration.

Embodiment 4 is the system of any of embodiment 1 to embodiment 3, wherein the flexibility indication indicates the flexibility is supported in timing of sensing transmissions.

Embodiment 5 is the system of any of embodiment 1 to embodiment 4, wherein the sensing configuration message includes a requested transmission configuration corresponding to a plurality of requested transmission parameters requested in a sensing transmission, and a plurality of fields indicating that respective ones of the plurality of requested transmission parameters may be adjusted.

Embodiment 6 is the system of embodiment 5, wherein a field from among the plurality of fields indicates a type or degree of permitted adjustment.

Embodiment 7 is the system of any of embodiment 1 to embodiment 6, wherein the sensing configuration response message includes a delivered transmission configuration indicating a plurality of applied transmission parameters.

Embodiment 8 is the system of any of embodiment 1 to embodiment 7, wherein the processor is further configured to execute instructions for transmitting, by the transmitting antenna, a sensing trigger message, and receiving, via the receiving antenna, a sensing response message transmitted in response to the sensing trigger message, the sensing response message including a delivered transmission configuration indicating a plurality of applied transmission parameters.

Embodiment 9 is the system of any of embodiment 1 to embodiment 8, wherein the delivered transmission configuration indicates adjustments made in requested transmission parameters.

Embodiment 10 is the system of any of embodiment 1 to embodiment 9, wherein the sensing configuration message includes a plurality of predefined steering matrix configurations and an indication of a preference ranking of the plurality of predefined steering matrix configurations.

Embodiment 11 is the system of embodiment 10, wherein one from the plurality of predefined steering matrix configurations includes at least one of a transmission antenna count, a minimum transmission antenna count, and a sensing antenna steering vector.

Embodiment 12 is the system of any of embodiment 1 to embodiment 11, wherein the sensing configuration response message includes a selected steering matrix configuration, the selected steering matrix configuration having a highest preference ranking of the plurality of predefined steering matrix configurations that permit aggregation of a sensing transmission with an existing non-sensing message.

Embodiment 13 is the system of any of embodiment 1 to embodiment 12, wherein the sensing configuration message includes a predefined steering matrix configuration and the processor is further configured to execute instructions for transmitting, by the transmitting antenna, a sensing trigger message including an indication that use of the predefined steering matrix configuration is optional.

Embodiment 14 is the system of embodiment 13, wherein the indication indicates that any steering matrix configuration may be used or that a unity steering matrix configuration may be used.

Embodiment 15 is a system for Wi-Fi sensing comprising a sensing device having a transmitting antenna, a receiving antenna, and at least one processor configured to execute instructions for transmitting, via the transmitting antenna, a sensing trigger message including a requested timing configuration, the requested timing configuration including a flexibility indication that the requested timing configuration is flexible, and receiving, via the receiving antenna, a sensing transmission transmitted in response to the sensing trigger message, wherein the sensing transmission includes a delivered transmission configuration.

Embodiment 16 is the system of embodiment 15, wherein the flexibility indication indicates a degree of adjustments permitted to the requested timing configuration.

Embodiment 17 is the system of embodiment 15 or embodiment 16, wherein the flexibility indication indicates an extended window of time within which the sensing transmission may be transmitted.

Embodiment 18 is the system of any of embodiment 15 to embodiment 17, wherein the requested timing configuration is indicative of timing requirements for a measurement campaign including a series of sensing transmissions from a remote device to the sensing device.

Embodiment 19 is the system of any of embodiment 15 to embodiment 18, wherein the processor is further configured to execute instructions for applying a time stamp to the sensing transmission.

Embodiment 20 is the system of any of embodiment 15 to embodiment 19, wherein the requested timing configuration includes at least one of a sensing measurement type, a time between sensing transmissions, a time flexibility window, and a number of sensing transmissions of a measurement campaign.

Embodiment 21 is a method for Wi-Fi sensing comprising: transmitting, via at least one transmitting antenna of a sensing initiator device, a sensing measurement setup request message, the sensing measurement setup request message including a requested sensing measurement parameters element; and receiving, via at least one receiving antenna of the sensing initiator device, a sensing measurement setup response message, wherein the sensing measurement setup response message includes one or more of: a transmission capability indication associated with a sensing responder device, and a delivered sensing measurement parameters element.

Embodiment 22 is the method of embodiment 21, wherein the requested sensing measurement parameters element includes a plurality of requested transmission parameters to be used for one or more sensing transmissions from the sensing responder device.

Embodiment 23 is the method of embodiment 22, wherein the requested sensing measurement parameters element includes a plurality of fields indicating that respective ones of the plurality of requested transmission parameters may be adjusted.

Embodiment 24 is the method of embodiments 22 or 23, wherein the plurality of requested transmission parameters include one or more of: a frequency band parameter, a bandwidth parameter, a channel parameter, a training field parameter, an index identifying a predefined steering matrix configuration, and a steering matrix configuration.

Embodiment 25 is the method of any of embodiments 21-24, wherein the delivered sensing measurement parameters element includes a plurality of delivered transmission parameters to be used for one or more sensing transmissions from the sensing responder device.

Embodiment 26 is the method of embodiment 25, wherein the delivered sensing measurement parameters element includes a plurality of fields indicating that respective ones of the plurality of delivered transmission parameters have been adjusted, for example, with respect to the plurality of requested transmission parameters.

Embodiment 27 is the method of embodiment 25, wherein the delivered sensing measurement parameters element includes a plurality of fields indicating that respective ones of the plurality of delivered transmission parameters may be adjusted.

Embodiment 28 is the method of embodiment 25, wherein the plurality of delivered transmission parameters includes one or more of: a frequency band parameter, a bandwidth parameter, a channel parameter, a training field parameter, a timing configuration, an index identifying a predefined steering matrix configuration, and a steering matrix configuration.

Embodiment 29 is the method of any of embodiments 21-28, wherein the delivered sensing measurement parameters element differs from the requested sensing measurement parameters element.

Embodiment 30 is the method of any of embodiments 21-29, wherein one or more of the sensing measurement setup request message and the sensing measurement setup response message are implemented as an IEEE 802.11 Action frame.

Embodiment 31 is a method for Wi-Fi sensing comprising receiving, via at least one receiving antenna of a sensing responder device, a sensing measurement setup request message, the sensing measurement setup request message including a requested sensing measurement parameters element; and transmitting, via at least one transmitting antenna of the sensing responder device, a sensing measurement setup response message, wherein the sensing measurement setup response message includes one or more of: a transmission capability indication associated with the sensing responder device, and a delivered sensing measurement parameters element.

Embodiment 32 is a system for Wi-Fi sensing, comprising: a sensing initiator device having at least one transmitting antenna, at least one receiving antenna, and at least one processor, the at least one processor configured for: transmitting, via the at least one transmitting antenna, a sensing measurement setup request message, the sensing measurement setup request message including a requested sensing measurement parameters element; and receiving, via the at least one receiving antenna, a sensing measurement setup response message, wherein the sensing measurement setup response message includes one or more of: a transmission capability indication associated with a sensing responder device, and a delivered sensing measurement parameters element.

Embodiment 33 is the system of embodiment 32, wherein the requested sensing measurement parameters element includes a plurality of requested transmission parameters to be used for one or more sensing transmissions from the sensing responder device.

Embodiment 34 is the system of embodiment 33, wherein the requested sensing measurement parameters element includes a plurality of fields indicating that respective ones of the plurality of requested transmission parameters may be adjusted.

Embodiment 35 is the system of embodiment 33, wherein the plurality of requested transmission parameters include one or more of: a frequency band parameter, a bandwidth parameter, a channel parameter, a training field parameter, an index identifying a predefined steering matrix configuration, and a steering matrix configuration.

Embodiment 36 is the system of any embodiments 32 to 35, wherein the delivered sensing measurement parameters element includes a plurality of delivered transmission parameters to be used for one or more sensing transmissions from the sensing responder device.

Embodiment 37 is the system of embodiment 36, wherein the delivered sensing measurement parameters element includes a plurality of fields indicating that respective ones of the plurality of delivered transmission parameters have been adjusted, for example, with respect to the plurality of requested transmission parameters.

Embodiment 38 is the system of embodiment 36, wherein the delivered sensing measurement parameters element includes a plurality of fields indicating that respective ones of the plurality of delivered transmission parameters may be adjusted.

Embodiment 39 is the system of embodiment 36, wherein the plurality of delivered transmission parameters includes one or more of: a frequency band parameter, a bandwidth parameter, a channel parameter, a training field parameter, a timing configuration, an index identifying a predefined steering matrix configuration, and a steering matrix configuration.

Embodiment 40 is the system of any embodiments 32 to 39, wherein the delivered sensing measurement parameters element differs from the requested sensing measurement parameters element.

Embodiment 41 is the system of any embodiments 32 to 40, wherein one or more of the sensing measurement setup request message and the sensing measurement setup response message are implemented as an IEEE 802.11 Action frame.

Embodiment 42 is a system for Wi-Fi sensing comprising: a sensing responder device having at least one receiving antenna, at least one transmitting antenna, and at least one processor, the at least one processor configured for: receiving, via the at least one receiving antenna, a sensing measurement setup request message, the sensing measurement setup request message including a requested sensing measurement parameters element; and transmitting, via the at least one transmitting antenna, a sensing measurement setup response message, wherein the sensing measurement setup response message includes one or more of: a transmission capability indication associated with the sensing responder device, and a delivered sensing measurement parameters element.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for Wi-Fi sensing, the method comprising:
    transmitting, via at least one transmitting antenna of a sensing initiator device, a sensing measurement setup request frame to a sensing responder to request a sensing measurement setup to be used in corresponding sensing measurement instances of a WLAN sensing session for performing sensing measurements on one or more sensing transmissions to monitor motion within a sensing space, the sensing measurement setup request frame including a requested sensing measurement parameters element;
    receiving, via at least one receiving antenna of the sensing initiator device, a sensing measurement setup response frame, wherein the sensing measurement setup response frame includes one or more of a transmission capability indication associated with the sensing responder device indicating whether the sensing responder can participate in the corresponding sensing measurement instances and a delivered sensing measurement parameters element for use in the corresponding sensing measurement instances; and
    transmitting, via the at least one transmitting antenna of the sensing initiator device, or receiving, via the at least one receiving antenna of the sensing initiator device, a first frame of a first corresponding sensing measurement instance configured in accordance with the sensing measurement setup response frame.

2. The method of claim 1, wherein the requested sensing measurement parameters element includes a plurality of requested transmission parameters to be used for one or more sensing transmissions from the sensing responder device.

3. The method of claim 2, wherein the requested sensing measurement parameters element includes a plurality of fields indicating that respective ones of the plurality of requested transmission parameters may be adjusted.

4. The method of claim 2, wherein the plurality of requested transmission parameters include one or more of:
    a frequency band parameter,
    a bandwidth parameter,
    a channel parameter,
    a training field parameter,
    an index identifying a predefined steering matrix configuration, and
    a steering matrix configuration.

5. The method of claim 1, wherein the delivered sensing measurement parameters element includes a plurality of delivered transmission parameters to be used for one or more sensing transmissions from the sensing responder device.

6. The method of claim 5, wherein the delivered sensing measurement parameters element includes a plurality of fields indicating that respective ones of the plurality of delivered transmission parameters have been adjusted.

7. The method of claim 5, wherein the delivered sensing measurement parameters element includes a plurality of fields indicating that respective ones of the plurality of delivered transmission parameters may be adjusted.

8. The method of claim 5, wherein the plurality of delivered transmission parameters includes one or more of:
    a frequency band parameter,
    a bandwidth parameter,
    a channel parameter,
    a training field parameter,
    a timing configuration,
    an index identifying a predefined steering matrix configuration, and
    a steering matrix configuration.

9. The method of claim 1, wherein one or more of the sensing measurement setup request frame and the sensing measurement setup response frame are implemented as an IEEE 802.11 Action frame.

10. The method of claim 4, wherein the index identifying the predefined steering matrix configuration configures a spatial stream to be applied to corresponding sensing measurement instances by the sensing responder device.

11. The method of claim 8, wherein the index identifying the predefined steering matrix configuration configures a spatial stream to be applied to corresponding sensing measurement instances by the sensing responder device.

12. A method for Wi-Fi sensing, the method comprising:
    receiving, via at least one receiving antenna of a sensing responder device, a sensing measurement setup request frame requesting a sensing measurement setup to be used in corresponding sensing measurement instances of a WLAN sensing session for performing sensing measurements on one or more sensing transmissions to monitor motion within a sensing space, the sensing measurement setup request frame including a requested sensing measurement parameters element; and
    transmitting, via at least one transmitting antenna of the sensing responder device, a sensing measurement setup response frame, wherein the sensing measurement setup response frame includes one or more of a transmission capability indication associated with the sensing responder device indicating whether the sensing responder can participate in the corresponding sensing measurement instances and a delivered sensing measurement parameters element for use in the corresponding sensing measurement instances; and transmitting, via the at least one transmitting antenna of the sensing responder device, or receiving, via the at least one receiving antenna of the sensing responder device, a first frame of a first corresponding sensing measurement instance configured in accordance with the sensing measurement setup response frame.

13. A system for Wi-Fi sensing, comprising:

a sensing initiator device having at least one transmitting antenna, at least one receiving antenna, and at least one processor, the at least one processor configured for:

transmitting, via the at least one transmitting antenna, a sensing measurement setup request frame to a sensing responder to request a sensing measurement setup to be used in corresponding sensing measurement instances of a WLAN sensing session for performing sensing measurements on one or more sensing transmissions to monitor motion within a sensing space, the sensing measurement setup request frame including a requested sensing measurement parameters element; and receiving, via the at least one receiving antenna, a sensing measurement setup response frame, wherein the sensing measurement setup response frame includes one or more of a transmission capability indication associated with the sensing responder device indicating whether the sensing responder can participate in the corresponding sensing measurement instances and a delivered sensing measurement parameters element for use in the corresponding sensing measurement instances; and transmitting, via the at least one transmitting antenna of the sensing initiator device, or receiving, via the at least one receiving antenna of the sensing initiator device, a first frame of a first corresponding sensing measurement instance configured in accordance with the sensing measurement setup response frame.

14. The system of claim 13, wherein the requested sensing measurement parameters element includes a plurality of requested transmission parameters to be used for one or more sensing transmissions from the sensing responder device.

15. The system of claim 14, wherein the requested sensing measurement parameters element includes a plurality of fields indicating that respective ones of the plurality of requested transmission parameters may be adjusted.

16. The system of claim 14, wherein the plurality of requested transmission parameters include one or more of:
a frequency band parameter,
a bandwidth parameter,
a channel parameter,
a training field parameter,
an index identifying a predefined steering matrix configuration, and
a steering matrix configuration.

17. The system of claim 13, wherein the delivered sensing measurement parameters element includes a plurality of delivered transmission parameters to be used for one or more sensing transmissions from the sensing responder device.

18. The system of claim 17, wherein the delivered sensing measurement parameters element includes a plurality of fields indicating that respective ones of the plurality of delivered transmission parameters have been adjusted.

19. The system of claim 17, wherein the delivered sensing measurement parameters element includes a plurality of fields indicating that respective ones of the plurality of delivered transmission parameters may be adjusted.

20. The system of claim 17, wherein the plurality of delivered transmission parameters includes one or more of:
a frequency band parameter,
a bandwidth parameter,
a channel parameter,
a training field parameter,
a timing configuration,
an index identifying a predefined steering matrix configuration, and
a steering matrix configuration.

21. The system of claim 13, wherein one or more of the sensing measurement setup request frame and the sensing measurement setup response frame are implemented as an IEEE 802.11 Action frame.

22. The system of claim 16, wherein the index identifying the predefined steering matrix configuration configures a spatial stream to be applied to corresponding sensing measurement instances by the sensing responder device.

23. The system of claim 20, wherein the index identifying the predefined steering matrix configuration configures a spatial stream to be applied to corresponding sensing measurement instances by the sensing responder device.

24. A system for Wi-Fi sensing comprising:

a sensing responder device having at least one receiving antenna, at least one transmitting antenna, and at least one processor, the at least one processor configured for:

receiving, via the at least one receiving antenna, a sensing measurement setup request frame requesting a sensing measurement setup to be used in corresponding sensing measurement instances of a WLAN sensing session for performing sensing measurements on one or more sensing transmissions to monitor motion within a sensing space, the sensing measurement setup request frame including a requested sensing measurement parameters element; and transmitting, via the at least one transmitting antenna, a sensing measurement setup response frame, wherein the sensing measurement setup response frame includes one or more of a transmission capability indication associated with the sensing responder device indicating whether the sensing responder can participate in the corresponding sensing measurement instances and a delivered sensing measurement parameters element for use in the corresponding sensing measurement instances; and transmitting, via the at least one transmitting antenna of the sensing responder device, or receiving, via the at least one receiving antenna of the sensing responder device, a first frame of a first corresponding sensing measurement instance configured in accordance with the sensing measurement setup response frame.

* * * * *